(12) United States Patent
Ponulak et al.

(10) Patent No.: US 9,008,840 B1
(45) Date of Patent: Apr. 14, 2015

(54) APPARATUS AND METHODS FOR REINFORCEMENT-GUIDED SUPERVISED LEARNING

(71) Applicant: Brain Corporation, San Diego, CA (US)

(72) Inventors: Filip Ponulak, San Diego, CA (US); Jean-Baptiste Passot, La Jolla, CA (US); Eugene Izhikevich, San Diego, CA (US); Olivier Coenen, San Diego, CA (US)

(73) Assignee: Brain Corporation, San Diego, CA (US)

(*) Notice: Subject to any disclaimer, the term of this patent is extended or adjusted under 35 U.S.C. 154(b) by 222 days.

(21) Appl. No.: 13/866,975

(22) Filed: Apr. 19, 2013

(51) Int. Cl.
*G06F 15/18* (2006.01)
*B25J 9/16* (2006.01)
*G05B 13/02* (2006.01)
*G06N 3/02* (2006.01)
*G06N 99/00* (2010.01)

(52) U.S. Cl.
CPC *B25J 9/163* (2013.01); *B25J 9/161* (2013.01); *G05B 13/0265* (2013.01); *G06N 3/02* (2013.01); *G06N 99/005* (2013.01)

(58) Field of Classification Search
CPC ............. G05B 13/00–13/048; G06N 3/02; G06N 3/82; G06N 3/084; G06N 3/086; G06N 3/088; G06N 99/005; B25J 9/161; B25J 9/1628; B25J 9/163
USPC ........................................................ 700/250
See application file for complete search history.

(56) References Cited

U.S. PATENT DOCUMENTS 5,063,603 A   11/1991   Burt
5,092,343 A   3/1992    Spitzer
(Continued)

FOREIGN PATENT DOCUMENTS

CN   102226740 A   10/2011
EP   1089436 A2   4/2001
(Continued)

OTHER PUBLICATIONS

PCT International Search Report for International Application PCT/US2013/060352 dated Jan. 16, 2014.
(Continued)

*Primary Examiner* — Khoi Tran
*Assistant Examiner* — Adam Mott
(74) *Attorney, Agent, or Firm* — Pillsbury Winthrop Shaw & Pittman LLP

(57) ABSTRACT

Framework may be implemented for transferring knowledge from an external agent to a robotic controller. In an obstacle avoidance/target approach application, the controller may be configured to determine a teaching signal based on a sensory input, the teaching signal conveying information associated with target action consistent with the sensory input, the sensory input being indicative of the target/obstacle. The controller may be configured to determine a control signal based on the sensory input, the control signal conveying information associated with target approach/avoidance action. The controller may determine a predicted control signal based on the sensory input and the teaching signal, the predicted control conveying information associated with the target action. The control signal may be combined with the predicted control in order to cause the robotic apparatus to execute the target action.

20 Claims, 16 Drawing Sheets

(56) References Cited

U.S. PATENT DOCUMENTS

| | | |
|---|---|---|
| 5,245,672 A | 9/1993 | Wilson |
| 5,355,435 A | 10/1994 | DeYong |
| 5,388,186 A | 2/1995 | Bose |
| 5,408,588 A | 4/1995 | Ulug |
| 5,467,428 A | 11/1995 | Ulug |
| 5,638,359 A | 6/1997 | Peltola |
| 5,673,367 A | 9/1997 | Buckley |
| 5,875,108 A | 2/1999 | Hoffberg |
| 6,009,418 A | 12/1999 | Cooper |
| 6,014,653 A | 1/2000 | Thaler |
| 6,363,369 B1 | 3/2002 | Liaw |
| 6,458,157 B1 | 10/2002 | Suaning |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,601,049 B1 | 7/2003 | Cooper |
| 6,643,627 B2 | 11/2003 | Liaw |
| 7,395,251 B2 | 7/2008 | Linsker |
| 7,426,501 B2 | 9/2008 | Nugent |
| 7,672,920 B2 | 3/2010 | Ito |
| 7,849,030 B2 | 12/2010 | Ellingsworth |
| 8,015,130 B2 | 9/2011 | Matsugu |
| 8,103,602 B2 | 1/2012 | Izhikevich |
| 8,315,305 B2 | 11/2012 | Petre |
| 8,467,623 B2 | 6/2013 | Izhikevich |
| 8,655,815 B2 | 2/2014 | Palmer |
| 2002/0038294 A1 | 3/2002 | Matsugu |
| 2003/0050903 A1 | 3/2003 | Liaw et al. |
| 2004/0193670 A1 | 9/2004 | Langan |
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0022068 A1 | 1/2007 | Linsker |
| 2007/0176924 A1 | 8/2007 | Nugent |
| 2007/0208678 A1 | 9/2007 | Matsugu |
| 2008/0024345 A1 | 1/2008 | Watson |
| 2008/0162391 A1 | 7/2008 | Izhikevich |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2010/0198765 A1 | 8/2010 | Fiorillo |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0160741 A1 | 6/2011 | Asano |
| 2012/0011090 A1 | 1/2012 | Tang |
| 2012/0011093 A1 | 1/2012 | Aparin |
| 2012/0036099 A1 | 2/2012 | Venkatraman |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073080 A1 | 3/2013 | Ponulak |
| 2013/0073491 A1 | 3/2013 | Izhikevich |
| 2013/0073493 A1 | 3/2013 | Modha |
| 2013/0073496 A1 | 3/2013 | Szatmary |
| 2013/0073500 A1 | 3/2013 | Szatmary |
| 2013/0151448 A1 | 6/2013 | Ponulak |
| 2013/0151449 A1 | 6/2013 | Ponulak |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297541 A1 | 11/2013 | Piekniewski |
| 2013/0325766 A1 | 12/2013 | Petre |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325776 A1 | 12/2013 | Ponulak |
| 2013/0325777 A1 | 12/2013 | Petre |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0193066 A1 | 7/2014 | Richert |

FOREIGN PATENT DOCUMENTS

| | | |
|---|---|---|
| JP | 4087423 | 3/1992 |
| RU | 2108612 C1 | 10/1998 |
| RU | 2406105 C2 | 12/2010 |
| WO | 2008083335 A2 | 7/2008 |
| WO | 2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages,cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cuntz et al., 'One Rule to Grow Them All: A General Theory of Neuronal Branching and Its Paractical Application' POLS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p. df>.

Gewaltig et al., 'NEST (Neural Simulation Tool)', Scholarpedia, 2007, pp. 1-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http:// www.neurophys.biomedicale.univparis5. fr/-graham/surf-hippo-files/Surf-Hippo%20Reference%20Manual.pdf, Mar. 2002, pp. 1-128.

Izhikevich, 'Polychronization: Computation with Spikes', Neural Computation, 25, 2006, 18, 245-282.

Izhikevich, 'Simple Model of Spiking Neurons', IEEE Transactions on Neural Networks, vol. 14, No. 6, Nov. 2003, pp. 1569-1572.

Izhikevich et al., 'Relating STDP to BCM', Neural Computation (2003) 15, 1511-1523.

Karbowski et al., 'Multispikes and Synchronization in a Large Neural Network with Temporal Delays', Neural Computation 12, 1573-1606 (2000).

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Laurent, 'The Neural Network Query Language (NNQL) Reference' [retrieved on Nov. 12, 2013]. Retrieved from the Internet: <URL'https://code.google.com/p/nnql/issues/detail?id=1>.

(56) References Cited

OTHER PUBLICATIONS

Laurent, 'Issue 1—nnql—Refactor Nucleus into its own file—Neural Network Query Language' [retrieved on Nov. 12, 2013]. Retrieved from the Internet: URL:https://code.google.com/p/nnql/issues/detail?id=1.

Nichols, A Re configurable Computing Architecture for Implementing Artificial Neural Networks on FPGA, Master's Thesis, The University of Guelph, 2003, pp. 1-235.

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.

Simulink.RTM. model [online], [Retrieved on Dec. 10, 2013] Retrieved from <URL: http://www.mathworks.com/ products/simulink/index.html&g;.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.

PCT International Search Report for PCT/US2013/052136 dated Nov. 30, 2013.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Seung, H. "Learning in spiking neural networks by reinforcement of stochastic synaptic transmission." Neuron vol. 40 No. 6 (2003): pp. 1063-1073.

Weber, C. et al. 'Robot docking with neural vision and reinforcement.' Knowledge-Based Systems vol. 17 No. 2 (2004): pp. 165-172.

Baras, D. et al. "Reinforcement learning, spike-time-dependent plasticity, and the BCM rule." Neural Computation vol. 19 No. 8 (2007): pp. 2245-2279.

de Queiroz, M. et al. "Reinforcement learning of a simple control task using the spike response model." Neurocomputing vol. 70 No. 1 (2006): pp. 14-20.

PCT International Search Report and Written Opinion for International Application No. PCT/US2013/044124 dated Sep. 12, 2013.

Bennett (1999), The early history of the synapse: from Plato to Sherrington. Brain Res. Bull., 50(2): 95-118.

Haykin, (1999), Neural Networks: A Comprehensive Foundation (Second Edition), Prentice-Hall.

"In search of the artificial retina" [online], Vision Systems Design, Apr. 1, 2007.

Kenji, (2000), Reinforcement Learning in Continuous Time and Space, Neural Computation, 12:1, 219-245.

Klute et al., (2002). Artificial Muscles: Actuators for Biorobotic Systems. The International Journal 0./ Robotics Research 21 :295-309.

Lendek et al., (2006) State Estimation under Uncertainty: A Survey. Technical report 06-004, Delft Center for Systems and Control Delft University of Technology.

Legenstein et al., (2008), A learning theory for reward-modulated spike timing-dependent plasticity with application to biofeedback. PLoS Computational Biology, 4(10): 1 -27.

Nikolic et al., (2011) High-sensitivity silicon retina for robotics and prosthetics.

Ponulak, (2005), ReSuMe—New supervised learning method for Spiking Neural Networks. Technical Report, Institute of Control and Information Engineering, Poznan University of Technology.

Ponulak et al., (2010) Supervised Learning in Spiking Neural Networks with ReSuMe: Sequence Learning, Classification and Spike-Shifting. Neural Comp., 22 (2): 467-510.

Sutton et al., (1998), Reinforcement Learning, an Introduction. MIT Press.

Schreiber et al., (2003), A new correlation-based measure of spike timing reliability. Neurocomputing, 52-54, 925-931.

Sutton, (1988). Learning to predict by the methods of temporal differences. Machine Learning 3(1), 9-44.

Stein, (1967). Some models of neural variability. Biophys. J., 7: 37-68.

Werbos, (1992), or Prokhorov D.V and Wunsch D.C. (1997) Adaptive Critic Designs, IEEE Trans Neural Networks, vol. 8, No. 5, pp. 997-1007.

White et al., (Eds.) (1992) Handbook of Intelligent Control: Neural, Fuzzy and Adaptive Approaches. Van Nostrand Reinhold, New York.

Widrow et al., (1960) Adaptive Switching Circuits. IRE WESCON Convention Record 4: 96-104.

Ponulak (2006) Supervised Learning in Spiking Neural Networks with ReSuMe Method. Doctoral Dissertation Poznan, Poland.

Florian (2007) Reinforcement Learning Through Modulation of Spike-Timing-Dependent Synaptic Plasticity, Neural Computation 19, 1468-1502 Massachusetts Institute of Technology.

Morrison, (2008)Phenomenological models of synaptic plasticity based on spike timing, Received: Jan. 16, 2008 / Accepted: Apr. 9, 2008 The Author(s).

Bouganis et al., (2010) "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.

Xie et al., (2004) "Learning in neural networks by reinforcement of irregular spiking", Physical Review E, vol. 69, letter 041909, pp. 1-10.

Floreano et al., (2008) Floreano et al. Neuroevolution: From Architectures to learning Evol. Intel. Jan 2008 1:47-62 (retrieved online on Apr. 24, 2013 from http://infoscience.epfl.ch/record/112676/files/FloreanoDuerrMattiussi2008pdf).

D'Cruz (1998) Reinforcement Learning in Intelligent Control: A Biologically-Inspired Approach to the Re/earning Problem Brendan May 1998.

Aleksandrov (1968), Stochastic optimization, Engineering Cybernetics, 5, 11-16.

Amari (1998), Why natural gradient?, Acoustics, Speech and Signal Processing, (pp. 1213-1216). Seattle, WA, USA.

Bartlett et al., (2000) "A Biologically Plausible and Locally Optimal Learning Algorithm for Spiking Neurons" Retrieved from http://arp.anu.edu.au/ftp/papers/jon/brains.pdf.gz.

Baxter et al. (2000.). Direct gradient-based reinforcement learning. In Proceedings of the International Symposium on Circuits.

Bohte et al., "A Computational Theory of Spike-Timing Dependent Plasticity: Achieving Robust Neural Responses via Conditional Entropy Minimization" 2004.

Bohte, (2000). SpikeProp: backpropagation for networks of spiking neurons. In Proceedings of ESANN'2000, (pp. 419-424).

Booij (2005, 6). A Gradient Descent Rule for Spiking Neurons Emitting Multiple Spikes. Information Processing Letters n. 6, v.95 , 552--558.

Breiman et al., "Random Forests" 33pgs, Jan. 2001.

Capel, "Random Forests and Ferns" LPAC, Jan. 11, 2012, 40 pgs.

El-Laithy (2011), A reinforcement learning framework for spiking networks with dynamic synapses, Comput Intell Neurosci.

(56) References Cited

OTHER PUBLICATIONS

Fletcher (1987), Practical methods of optimization, New York, NY: Wiley-Interscience.

Florian (2005), A reinforcement learning algorithm for spiking neural networks SYNASC '05 Proceedings of the Seventh International Symposium on Symbolic and Numeric Algorithms for Scientific Computing.

Fremaux et al., "Functional Requirements for Reward-Modulated Spike-Timing-Dependent Plasticity", The Journal of Neuroscience, Oct. 6, 2010, 30(40):13326-13337.

Fu (2005) Stochastic Gradient Estimation, Technical Research Report.

Fu (2008), What You Should Know About Simulation and Derivatives Naval Research Logistics, vol. 55, No. 8 , 723-736.

Fyfe et al., (2007), Reinforcement Learning Reward Functions for Unsupervised Learning, ISNN '07 Proceedings of the 4th international symposium on Neural Networks: Advances in Neural Networks.

Gerstner (2002), Spiking neuron models: single neurons, populations, plasticity, Cambridge, U.K.: Cambridge University Press.

Glynn (1995), Likelihood ratio gradient estimation for regenerative stochastic recursions, Advances in Applied Probability, 27, 4, 1019-1053.

Ho, "Random Decision Forests" Int'l Conf. Document Analysis and Recognition, 1995, 5 pgs.

Izhikevich (2007), Solving the distal reward problem through linkage of STDP and dopamine signaling, Cerebral Cortex, vol. 17, pp. 2443-2452.

Kalal et al. "Online learning of robust object detectors during unstable tracking" published on 3rd On-line Learning for Computer Vision Workshop 2009, Kyoto, Japan, IEEE CS.

Kiefer (1952), Stochastic Estimation of the Maximum of a Regression Function, Annals of Mathematical Statistics 23, #3, 462-466.

Klampfl (2009), Spiking neurons can learn to solve information bottleneck problems and extract independent components, Neural Computation, 21(4), pp. 911-959.

Kleijnen et al., Optimization and sensitivity analysis of computer simulation models by the score function method Invited Review European Journal of Operational Research, Mar. 1995.

Larochelle et al., (2009), Exploring Strategies for Training Deep Neural Networks, J. of Machine Learning Research, v. 10, pp. 1-40.

Ojala et al., "Performance Evaluation of Texture Measures with Classification Based on Kullback Discrimination of Distributions" 1994 IEEE, pp. 582-585.

Ozuysal et al., "Fast Keypoint Recognition in Ten Lines of Code" CVPR 2007.

Ozuysal et al., "Fast Keypoint Recognition Using Random Ferns" IEEE Transactions on Pattern Analysis and Machine Intelligence, vol. 32, No. 3, Mar. 2010, pp. 448-461.

Pfister (2003), Optimal Hebbian Learning: A Probabilistic Point of View, In ICANN Proceedings. Springer, pp. 92-98.

Pfister (2006), Optimal Spike-Timing Dependent Plasticity for Precise Action Potential Firing in Supervised Learning, Neural computation ISSN 0899-7667, 18 (6).

Reiman et al. (1989). Sensitivity analysis for simulations via likelihood ratios. Oper Res 37, 830-844.

Robbins (1951), A Stochastic Approximation Method, Annals of Mathematical Statistics 22, #3, 400-407.

Rosenstein et al., (2002), Supervised learning combined with an actor-critic architecture, Technical Report 02-41, Department of Computer Science, University of Massachusetts, Amherst.

Kleijnen et al., "Optimization and sensitivity analysis of computer simulation models by the score function method", Invited Review European Journal of Operational Research, Mar. 1995.

Rumelhart et al., (1986), Learning representations by back-propagating errors, Nature 323 (6088) , pp. 533-536.

Rumelhart (1986), Learning internal representations by error propagation, Parallel distributed processing, vol. 1 (pp. 318-362), Cambridge, MA: MIT Press.

Sinyavskiy, et al. "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.

Tishby et al., (1999), The information bottleneck method, In Proceedings of the 37th Annual Allerton Conference on Communication, Control and Computing, B Hajek & RS Sreenivas, eds., pp. 368-377, University of Illinois.

Toyoizumi (2007), Optimality Model of Unsupervised Spike-Timing Dependent Plasticity: Synaptic Memory and Weight Distribution, Neural Computation, 19 (3).

Toyoizumi et al., (2005), Generalized Bienenstock-Cooper-Munro rule for spiking neurons that maximizes information transmission, Proc. Natl. Acad. Sci. USA, 102, (pp. 5239-5244).

Vasilaki et al., "Spike-Based Reinforcement Learning in Continuous State and Action Space: When Policy Gradient Methods Fail" PLoS, vol. 5, Issue 12, Dec. 2009.

Vasilaki, et al., "Learning flexible sensori-motor mappings in a complex network" Biol Cybern (2009) 100:147-158.

Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.

Weber et al., (2009), Goal-Directed Feature Learning, In: Proc, International Joint Conference on Neural Networks, 3319-3326.

Williams (1992), Simple Statistical Gradient-Following Algorithms for Connectionist Reinforcement Learning, Machine Learning 8, 229-256.

Yi (2009), Stochastic search using the natural gradient, ICML '09 Proceedings of the 26th Annual International Conference on Machine Learning. New York, NY, USA.

PCT International Search Report for International Application PCT/US2013/060352 dated Jan. 16, 2014.

Sinyavskiy O. Yu.: 'Obuchenic s podkrepleniem spaikovoy neiroiniy seti v zadache upravleniya agentom v diskretnoy virtualnoy srede.' Nelineinaya Dinamika vol. T. 7., No. 24, 2011, pp. 859-875.

Hagras, Hani et al., "Evolving Spiking Neural Network Controllers for Autonomous Robots", IEEE 2004.

Masakazu et al, "Convolutional Spiking Neural Network Model for Robust Face Detection", 2002 Proceedings of the 9th International Conference on Neural Information Processing (ICONIP'02), vol. 2.

Jesper Tegner, et al., 2002 "An adaptive spike-timing-dependent plasticity rule" Elsevier Science B.V.

Schrauwen et al., "Improving SpikeProp: Enhancements to an Error-Backpropagation Rule for Spiking Neural Networks", ProsRISC workshop, 2004, pp. 301-305.

Ponulak, "Analysis of the Resume learning Process for Spiking Neural Networks," International Journal of Applied Mathematics & Computer Science: Jun. 2008, vol. 18, Issue 2, pp. 117-127.

APPARATUS AND METHODS FOR REINFORCEMENT-GUIDED SUPERVISED LEARNING

CROSS-REFERENCE TO RELATED APPLICATIONS

This application is related to co-pending and co-owned U.S. patent application Ser. No. 13/842,530 entitled "ADAPTIVE PREDICTOR APPARATUS AND METHODS"; BC201308A, U.S. patent application Ser. No. 13/842,562 entitled "ADAPTIVE PREDICTOR APPARATUS AND METHODS FOR ROBOTIC CONTROL"; BC201309A, U.S. patent application Ser. No. 13/842,583 entitled "APPARATUS AND METHODS FOR TRAINING OF ROBOTIC DEVICES"; BC201310A, U.S. patent application Ser. No. 13/842,616 entitled "ROBOTIC APPARATUS AND METHODS FOR DEVELOPING A HIERARCHY OF MOTOR PRIMITIVES"; BC201311A, U.S. patent application Ser. No. 13/842,647 entitled "MULTICHANNEL ROBOTIC CONTROLLER APPARATUS AND METHODS"; BC201312A, filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to adaptive control and training of robotic devices.

2. Description of Related Art

Robotic devices may be used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots (e.g., iRobot Roomba®) may learn to operate via exploration.

Programming robots may be costly and remote control may require a human operator. Furthermore, changes in the robot model and/or environment may require changes in the programming code. Remote control typically relies on user experience and/or agility that may be inadequate when dynamics of the control system and/or environment (e.g., an unexpected obstacle appears in path of a remotely controlled vehicle) change rapidly.

SUMMARY

One aspect of the disclosure relates to a method of generating a predicted control output by an adaptive controller of a robotic apparatus comprising a predictor and a combiner. The method may comprise: configuring the adaptive controller to operate in accordance with a reinforcement learning process based on a reinforcement signal, the reinforcement signal based on a performance measure associated with the reinforcement learning process; configuring the predictor to operate in accordance with a supervised learning process based on teaching signal, the teaching signal conveying information related to target output of the predictor; configuring the adaptive controller, using one or more processors, to generate a control output based on a sensory input and the reinforcement signal, the sensory input including information associated with an environment of the robotic apparatus; configuring the predictor, using one or more processors, to determine a predicted control output based on the sensory input and the teaching signal; configuring the combiner, using one or more processors, to determine a combined output based on the control output and the predicted control output, the combined output being characterized by a transform function; and configuring the adaptive controller, using one or more processors, to provide the combined output to the robotic apparatus, the combined output being configured to cause the robotic apparatus to execute a maneuver in accordance with the sensory input. The teaching signal comprises the combined control output.

In some implementations, the sensory input may comprise a representation of an object being present in the sensory input. The execution of the maneuver in accordance with the sensory input may comprise at least one of approaching the object or avoiding the object.

In some implementations, the sensory input may comprise a stream of digitized frames of pixels. The representation of the object may be determined based on a spatial configuration of two or more pixels within at least one frame of the stream of digitized frames.

In some implementations, the learning process may be characterized by a learning parameter. The reinforcement signal may be configured to cause adjustment of the learning parameter based on a value of the performance measure. The control output may be determined based on the learning parameter. The process performance may be determined based on a quantity capable of may be determined based on the control output and target control output. The adjusting of the learning parameter may cause generation of a second control output. The second output may be characterized by a reduced value of the quantity for the sensory input.

In some implementations, the reinforcement signal may comprise positive reinforcement responsive to the second output being closer to the target control output relative to the control output. The reinforcement signal may comprise negative reinforcement responsive to the second output being farther away from the target control output relative to the control output.

In some implementations, the transform function may be configured to combine the predicted output and the control output via one or more operations including an additive operation.

In some implementations, the transform function may be configured to combine the predicted output and the control output via one or more operations including a union operation.

In some implementations, the predicted control output may comprise a signal configured to cause the robotic apparatus to execute a portion of the maneuver.

In some implementations, the transform function may be configured to produce the predicted control output responsive to the control output comprising a zero signal. The zero signal may correspond to a base state of the control output.

In some implementations, the transform function may be configured to produce the control output responsive to the predicted control output comprising the zero signal. The control output, the combined output, and/or the predicted control output may each comprise a spiking signal characterized by spike rate. The zero signal may correspond to a base spike rate. A non-zero signal may be characterized by a spike rate substantially different from the base spike rate.

In some implementations, the transform function may be characterized by a delay parameter configured such that the combined output at a first time instance is configured based on the control output at a second time instance. The second time instance may precede the first time instance by a current value of the delay parameter.

In some implementations, the reinforcement learning process may be configured based on a network of computerized neurons configured to be adapted in accordance with the sensory input and the reinforcement signal. Multiple ones of the computerized neurons may be interconnected by connections characterized by connection efficacy. The adaptation may comprise adapting the connection efficacy of individual connections based on the sensory input and the reinforcement signal.

In some implementations, the supervised learning process may be configured based on a network of computerized neurons configured to be adapted in accordance with the sensory input and the teaching signal. Multiple ones of the computerized neurons may be interconnected by connections characterized by connection efficacy. The supervised learning process adaptation may comprise adapting the connection efficacy of individual connections based on the sensory input and the teaching signal.

In some implementations, the supervised learning process may be configured to be updated at time intervals. The adaptation may be based on an error measure between (i) the predicted output generated at a given time instance and (ii) the teaching signal determined at another given time instance prior to the given time instance. The given time instance and the other given time instance may be separated by one of the time intervals.

Another aspect of the disclosure relates to a computerized controller apparatus of a robot. The apparatus may comprise a controller block, a predictor block, and one or more processors. The one or more processors may be configured to execute computer program modules to perform a method of transferring information related to execution of a control task associated with a sensory context by the robot from the controller block to the predictor block. The method may comprise: configuring the predictor block to operate in accordance with a supervised learning process based on a teaching input, the teaching input being provided by the control block based on a reinforcement learning process configured to be adapted based on the sensory context and a reinforcement signal, the reinforcement learning process adaptation being configured to occur during one or more trials effectuated prior to the provision of the teaching input; and based on the sensory context, causing the predictor block to generate a predicted control output configured to cause the execution of the control task.

In some implementations, the reinforcement learning process adaptation may be configured to cause generation of a control output by the control block prior to the provision of the teaching input. The control output may be configured to cause the execution of the control task.

In some implementations, the predicted control output generation may be based on adaptation of the supervised learning process responsive to the teaching input. The adaptation of the supervised learning process may be effectuated during two or more successive training epochs configured such that there exist at least one epoch of the two or more training epochs wherein output of the predictor block is incapable of causing the execution of the control task.

Yet another aspect of the disclosure relates to a computerized robotic control apparatus. The apparatus may comprise one or more processors configured to execute computer program modules. The computer program modules may comprise a first logic module, a second logic module, a third logic module, a fourth logic module, and/or other modules. The first logic module may be configured to determine a teaching signal based on a sensory input. The teaching signal may convey information associated with target action consistent with the sensory input. The sensory input may be indicative of at least one object in an environment of the robot. The second logic module may be configured to determine a control signal based on the sensory input. The control signal may convey information associated with the target action. The third logic module configured to determine a predicted control signal based on the sensory input and the teaching signal. The predicted control may convey information associated with the target action. The fourth logic module may be configured to combine the control signal and the predicted control signal into a combined control output. The combined control output may be configured to cause the robotic apparatus to execute a maneuver. The target action may comprise the maneuver.

In some implementations, the third logic module may be configured in accordance with supervised learning process configured to be adapted based on the sensory input and the teaching signal. The first and the second logic modules may be each configured in accordance with reinforcement learning process based on the sensory input and a reinforcement signal provided by an external agent. The reinforcement learning process may be configured to cause the determination of the control signal. The reinforcement signal may be based on a performance measure associated with the reinforcement learning process.

In some implementations, the external agent may be either a human operator or a computerized apparatus configured to generate the reinforcement signal based on a performance measure associated with the execution of the maneuver.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1A:
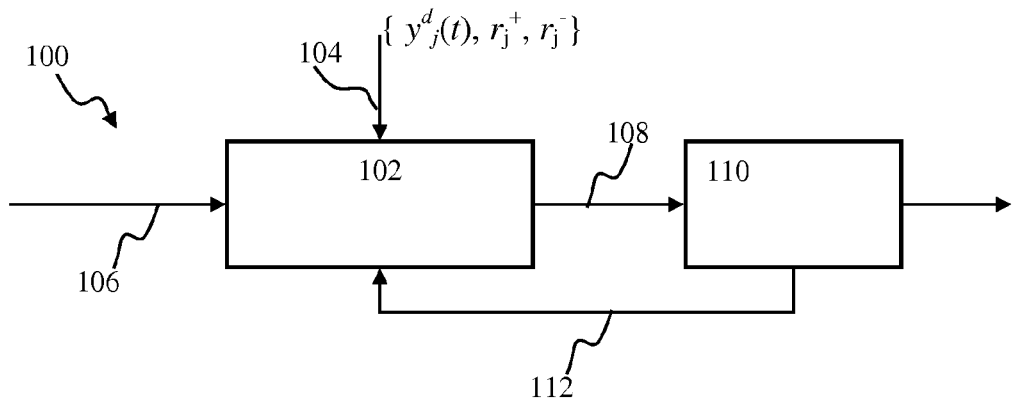
FIG. 1A is a block diagram illustrating a robotic apparatus, according to one or more implementations.

All Figures disclosed herein are © Copyright 2013 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" may be meant generally to denote all types of interconnection or communication architecture that may be used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" may be meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" may be meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" may be meant to refer, without limitation, to a network unit (e.g., a spiking neuron and a set of synapses configured to provide input signals to the neuron) having parameters that are subject to adaptation in accordance with a model.

As used herein, the terms "state" and "node state" may be meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" may include one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

The present disclosure provides, among other things, a computerized apparatus and methods for facilitating state-dependent learning in spiking neuron networks by, inter alia, implementing plasticity updates that are based on internal state of post-synaptic neuron. In one or more implementations, network updates may comprise modification of one or more learning parameters of the network. In some implementations, the learning parameter may comprise synaptic efficacy. The parameter update may comprise plasticity rules that are based on neuron state. In some implementations, the update rule may be effectuated using eligibility traces. In some implementations, the trace may comprise a temporary record of the occurrence of one or more events, such as visiting of a state, and/or the taking of an action (e.g., post-synaptic response), and/or a receipt of pre-synaptic input. The trace may denote characteristics of the event (e.g., the synaptic connection, pre- and post-synaptic neuron IDs) as eligible for undergoing learning changes.

In some implementations, learning parameters of one or more connections may be updated based on an input event, such as pre-synaptic input and/or a teaching signal. In some implementations, the update may be effectuated based on a response by the post-synaptic neuron.

In one or more implementations, the state of the neuron may be characterized by neuron excitability parameter, such as, for example, neuron membrane potential. In order to determine a change of the learning parameter, a current value of the neuron state may be compared to a threshold. In some implementations, the threshold may characterize a pulse generation (e.g., firing threshold) configured so as to cause response by the neuron when the neuron state breaches the threshold (e.g., super threshold state).

Detailed descriptions of the various implementation of apparatus and methods of the disclosure are now provided. Although certain aspects of the disclosure can best be understood in the context of robotic adaptive control system comprising a spiking neural network, the disclosure is not so limited. Implementations of the disclosure may also be used for implementing a variety of learning systems, such as, for example, sensory signal processing (e.g., computer vision), signal prediction (e.g., supervised learning), finance applications, data clustering (e.g., unsupervised learning), inventory control, data mining, and/or other applications that do not require performance function derivative computations.

Implementations of the disclosure may be, for example, deployed in a hardware and/or software implementation of a neuromorphic computer system. In some implementations, a robotic system may include a processor embodied in an application specific integrated circuit, which can be adapted or configured for use in an embedded application (e.g., a prosthetic device).

Artificial spiking neural networks may be used to gain an understanding of biological neural networks and/or for solving artificial intelligence problems. These networks may employ a pulse-coded mechanism, which encodes information using timing of the pulses. Such pulses (also referred to as "spikes" or "impulses") may be short-lasting (e.g., on the order of 1-2 ms) discrete temporal events. Several exemplary implementations of such encoding are described in a commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

FIG. 1A illustrates one implementation of an adaptive robotic apparatus for use with the adaptive predictor methodology described herein. The apparatus 100 of FIG. 1A may comprise an adaptive controller 102 and a plant (e.g., robotic platform) 110. The controller 102 may be configured to generate control output 108 for the plant 110. The output 108 may comprise one or more motor commands (e.g., pan camera to the right), sensor acquisition parameters (e.g., use high resolution camera mode), commands to the wheels, arms, and/or other actuators on the robot, and/or other parameters. The output 108 may be configured by the controller 102 based on one or more sensory inputs 106. The input 106 may comprise data used for solving a particular control task. In one or more implementations, such as those involving a robotic arm or autonomous robot, the signal 106 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the signal 106 may comprise an array of pixel values in the input image, and/or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 106 may comprise a target motion trajectory. The motion trajectory may be used to predict a future state of the robot on the basis of a current state and the target state. In one or more implementations, the signals in FIG. 1A may be encoded as spikes.

The controller 102 may be operable in accordance with a learning process (e.g., reinforcement learning and/or supervised learning). In one or more implementations, the controller 102 may optimize performance (e.g., performance of the system 100 of FIG. 1A) by minimizing average value of a performance function as described in detail in co-owned U.S. patent application Ser. No. 13/487,533, entitled "STOCHASTIC SPIKING NETWORK LEARNING APPARATUS AND METHODS", incorporated herein by reference in its entirety.

Figure 1B:
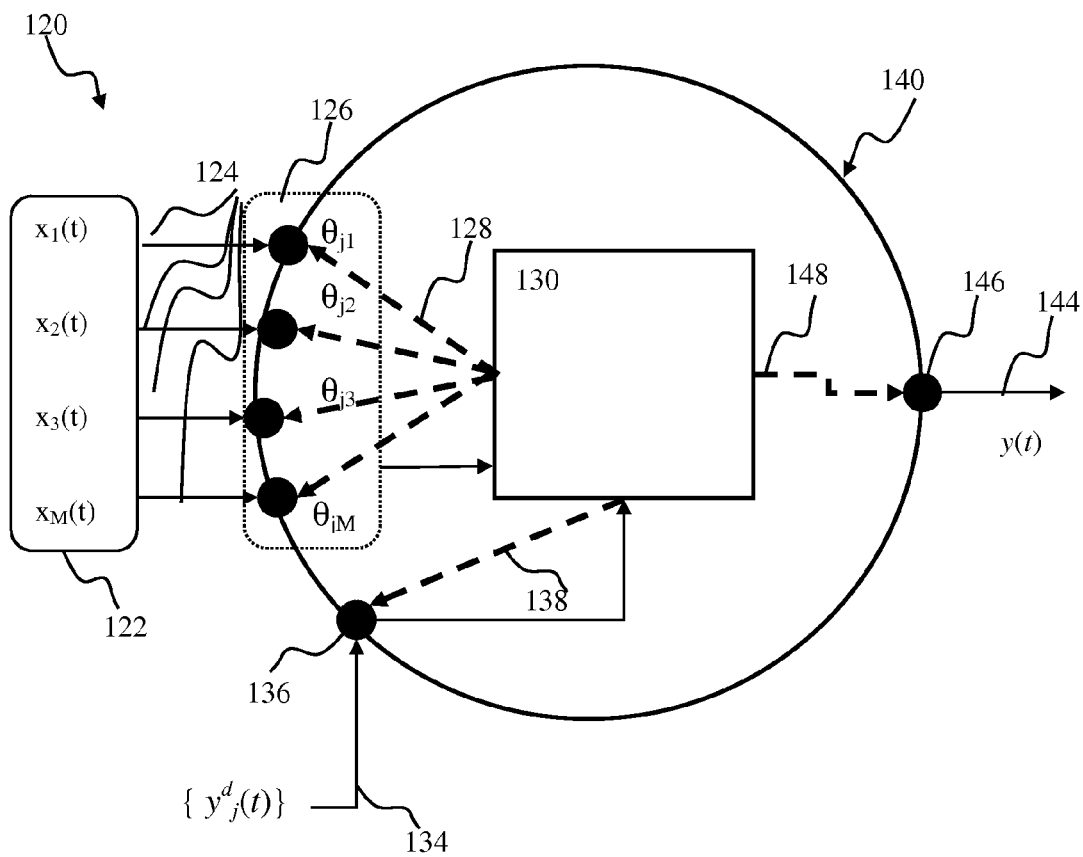
FIG. 1B is a block diagram illustrating spiking neural network for use with adaptive controller of FIG. 1A, in accordance with one or more implementations.

FIG. 1B illustrates an artificial neuron configured to implement the learning process of adaptive controller (e.g., 102 of FIG. 1A). The network 120 may comprise at least one spiking neuron 140, operable according to, for example, a Spike Response Process (SRP) denoted by block 130 in FIG. 1B. The neuron 140 may receive M-dimensional input stream X(t) 122 via connections 124. In some implementations, the M-dimensional stream may correspond to M-input synaptic connections 124 into the neuron 140. As shown in FIG. 1B, individual input connections 124 may be characterized by a connection parameter 126 $\theta ij$. The parameter hat $\theta$ may be referred to as the learning parameter and configured to be adjusted during learning. In one or more implementation, the learning parameter may comprise connection efficacy (e.g., weight). In some implementations, the learning parameter may comprise transmission (e.g., synaptic) delay. In some implementations, the parameter 126 may comprise probability of spike transmission via the respective connection.

In some implementations, the neuron 140 may be configured to receive external input via the connection 134. In one or more implementations, the input 134 may comprise training input. In some implementations of supervised learning, the training input 134 may comprise a supervisory spike that may be used to trigger neuron post-synaptic response.

The following signal notation may be used in describing operation of the network 120, below:

$y(t) = \Sigma_k \delta(t - t_k^{out})$ may denote output spike pattern of output signal 144 produced by the neuron 140; and $y^d(t) = \Sigma_{t_k} \delta(t - t_k^d)$ may denote the teaching spike pattern, corresponding to the target (or reference) signal that is part of external signal 134 of FIG. 1B, where $t_k^d$ denotes the times when the spikes of the reference signal may be received by the neuron.

In some implementations, the neuron 140 may be configured to receive training inputs. The training inputs may comprise the desired output (reference signal) $y^d(t)$ via the connection 404. In some implementations, the neuron 140 may be configured to receive positive and negative reinforcement signals via the connection 134. Parameters $r^+, r^-$ in of FIG. 1B may denote the reinforcement signal spike stream, which may be expressed as:

$$r^+(t) = \Sigma_i \delta(t - t_i^+), r^-(t) = \Sigma_i \delta(t - t_i^-), \qquad \text{(Eqn. 1)}$$

where $t_i^+, t_i^-$ denote the spike times associated, for example, with positive and negative reinforcement, respectively.

The neuron 140 may be configured to generate output y(t) (e.g., a post-synaptic spike) that may be delivered to the desired targets (e.g., other neurons of the network, not shown) via one or more output connections (e.g., 144 in FIG. 1B). As shown in FIG. 1B, individual output connections 144 may be characterized by a connection parameter 146 that may be adjusted during learning. In one or more implementation, the connection parameter 146 may comprise connection efficacy (e.g., weight). In some implementations, the parameter 146 may comprise synaptic delay. In some implementations, the parameter 146 may comprise spike transmission probability.

The neuron 140 may be configured to implement controller functionality, such as described for example in U.S. patent application Ser. No. 13/487,533, entitled "STOCHASTIC SPIKING NETWORK LEARNING APPARATUS AND METHODS", filed Jun. 4, 2012, incorporated supra, in order to control, for example, a robotic arm. The output signal y(t) may include motor control commands configured to move a robotic arm along a target trajectory. The process 130 may be characterized by internal state q. The internal state q may, for example, comprise a membrane voltage of the neuron, conductance of the membrane, and/or other parameters. The process 130 may be characterized by one or more learning parameter which may comprise input connection efficacy, 126, output connection efficacy 146, training input connection efficacy 136, response generating (firing) threshold, resting potential of the neuron, and/or other parameters. In one or more implementations, some learning parameters may comprise probabilities of signal transmission between the units (e.g., neurons) of the network.

In some implementations, the training input (e.g., 134 in FIG. 1B) may be differentiated from sensory inputs (e.g., provided via the connections 124) to the neuron 140 as follows. During learning: data (e.g., spike events) arriving to the neuron 140 via the connections 124 may cause changes in the neuron state (e.g., increase neuron membrane potential and/or other parameters). Changes in the neuron state may cause the neuron to generate a response (e.g., output a spike). Teaching data arriving to the neuron 140 via the connection 134 may cause (i) changes in the neuron dynamic model (e.g., modify parameters a,b,c,d of Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning): data (e.g., spike events) arriving to the neuron 140 via the connections 124 may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

Connections 124 in FIG. 1B may communicate one or more spiking and/or analog inputs. As used herein the term 'spiking' signal may be used to describe signals comprising one or more discrete events. In some implementations, a spiking signal may comprise a stream of bits where value of '1' may be used to indicate individual events. In some implementations, spiking signal may comprise one or more messages (having for example a time stamp associated therewith) corresponding to individual events.

As used herein the term 'non-spiking' and/or 'analog' signal may be used to describe real world continuous signals. In some implementations, the non-spiking signal may comprise an analog signal (e.g., a voltage and/or a current produced by a source). In one or more implementations, the non-spiking signal may comprise a digitized signal (e.g., sampled at regular intervals (sampling rate) with a given resolution). In some implementations, the continuous signal may include one or more of an analog signal, a polyadic signal with arity greater than 2, an n-bit long discrete signal with n-bits greater than 2, a real-valued signal, and/or other continuous signal.

In one or more implementations, such as object recognition, and/or obstacle avoidance, the input 122 may comprise a stream of pixel values associated with one or more digital images (e.g., video, radar, sonography, x-ray, magnetic resonance imaging, and/or other types). Pixel data may include data conveying information associated with one or more of RGB, CMYK, HSV, HSL, grayscale, and/or other information. Pixels and/or groups of pixels associated with objects and/or features in the input frames may be encoded using, for example, latency encoding described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co pending U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-pending U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, each of the foregoing being incorporated herein by reference in its entirety.

The learning parameters associated with the input/output connections (e.g., the parameters 126, 136, 146) may be adjusted in accordance with one or more rules, denoted in FIG. 1B by broken arrows 128, 138, 148, respectively.

The rules may be configured to implement synaptic plasticity in the network. In some implementations, the plastic rules may comprise one or more spike-timing dependent plasticity, such as rule comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012; conditional plasticity rules described in U.S. patent application Ser. No. 13/541,531, entitled "CONDITIONAL PLASTICITY SPIKING NEURON NETWORK APPARATUS AND METHODS", filed Jul. 3, 2012; plasticity configured to stabilize neuron response rate as described in U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/660,945, entitled "MODULATED PLASTICITY APPARATUS AND METHODS FOR SPIKING NEURON NETWORKS", filed Oct. 25, 2012; and U.S. patent application Ser. No. 13/774,934, entitled "APPARATUS AND METHODS FOR RATE-MODULATED PLASTICITY IN A SPIKING NEURON NETWORK", filed Feb. 26, 2013; multimodal rules described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety Connection efficacy updated may be effectuated using a variety of applicable methodologies such as, for example, event based updates described in detail in co-owned U.S. patent application Ser. No. 13/239, filed Sep. 21, 2011, entitled "APPARATUS AND METHODS FOR SYNAPTIC UPDATE IN A PULSE-CODED NETWORK"; 201220, U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012; and U.S. patent application Ser. No. 13/560,891 entitled "APPARATUS AND METHODS FOR EFFICIENT UPDATES IN SPIKING NEURON NETWORKS", each of the foregoing being incorporated herein by reference in its entirety.

Neuron process 130 may comprise one or more learning rules configured to adjust neuron state and/or generate neuron output in accordance with neuron inputs (e.g., 122, 124 in FIG. 1B).

In some implementations, the one or more leaning rules may comprise state dependent learning rules described, for example, in U.S. patent application Ser. No. 13/560,902, entitled "APPARATUS AND METHODS FOR STATE-DEPENDENT LEARNING IN SPIKING NEURON NETWORKS", filed Jul. 27, 2012 and/or pending U.S. patent application Ser. No. 13/722,769 filed Dec. 20, 2012, and entitled "APPARATUS AND METHODS FOR STATE-DEPENDENT LEARNING IN SPIKING NEURON NETWORKS", each of the foregoing being incorporated herein by reference in its entirety.

In one or more implementations, the one or more leaning rules may be configured to comprise one or more reinforcement learning, unsupervised learning, and/or supervised learning as described in co-owned and co-pending U.S. patent application Ser. No. 13/487,499 entitled "STOCHASTIC APPARATUS AND METHODS FOR IMPLEMENTING GENERALIZED LEARNING RULES, incorporated supra.

In one or more implementations, the one or more leaning rules may be configured in accordance with focused exploration rules such as described, for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, the foregoing being incorporated herein by reference in its entirety.

Adaptive controller (e.g., the controller apparatus 102 of FIG. 1A) may comprise an adaptable predictor block configured to, inter alia, predict controller output (e.g., 108) based on the sensory input (e.g., 106 in FIG. 1A) and teaching input (e.g., 104 in FIG. 1A).

Dynamics equations of a spiking neuron model may be expressed as a superposition of input, interaction between the input current and the neuronal state variables, and neuron reset after the spike, as follows:

$$\frac{d\vec{q}}{dt} = V(\vec{q}) + \sum_{t^{out}} R(\vec{q})\delta(t - t^{out}) + G(\vec{q})I^{ext}, \quad \text{(Eqn. 2)}$$

where:

$\vec{q}$ is a vector of internal state variables (e.g., comprising membrane voltage);

$I^{ext}$ is external input into neuron;

V is the function that defines evolution of the state variables;

G describes the interaction between the input current and the state variables (for example, to model postsynaptic potentials); and R describes resetting the state variables after the output spikes at $t^{out}$.

According to some implementations, for IF model the state vector and the state model may be expressed as:

$$\vec{q}(t) \equiv u(t); V(\vec{q}) = -Cu; R(\vec{q}) = u_{res}; G(\vec{q}) = 1, \quad \text{(Eqn. 3)}$$

where C is a membrane constant and $u_{res}$ is a value to which voltage is set after output spike (reset value). Accordingly, Eqn. 2 may become:

$$\frac{du}{dt} = -Cu \sum_{t^{out}} (u_{refr} - u)\delta(t - t^{out}) + I^{ext} \quad \text{(Eqn. 4)}$$

In one implementations, the neuron model, Eqn. 2 may be expressed as:

$$\frac{dv}{dt} = 0.04v^2 + 5v + 140 - u + \sum_{t^{out}}(c - v)\delta(t - t^{out}) + I^{ext} \quad \text{(Eqn. 5)}$$

and $$\frac{du}{dt} = -a(bv - u) + d\sum_{t^{out}}\delta(t - t^{out}),$$

where:

$$q(t) \equiv \begin{pmatrix} v(t) \\ u(t) \end{pmatrix}; \quad \text{(Eqn. 6)}$$

$$V(q) = \begin{pmatrix} 0.04v^2(t) + 5v(t) + 140 - u(t) \\ a(bv(t) - u(t)) \end{pmatrix};$$

$$R(q) = \begin{pmatrix} c - v(t) \\ d \end{pmatrix};$$

$$G(q) = \begin{pmatrix} 1 \\ 0 \end{pmatrix}$$

and a,b,c,d are parameters of the model.

Some algorithms for spike-time learning in spiking neural networks may be represented using the following general equation described, for example, in co-pending and co-owned U.S. patent application Ser. No. 13/487,499 entitled "STOCHASTIC APPARATUS AND METHODS FOR IMPLEMENTING GENERALIZED LEARNING RULES", incorporated supra:

$$\frac{d\theta_{i,k}(t)}{dt} = \eta(t)F(t)e_{i,j}(t), \quad \text{(Eqn. 7)}$$

where:
- $\theta_i(t)$ is an adaptation (learning) parameter of a synaptic connection between the pre-synaptic neuron i and the post-synaptic neuron j;
- $\eta(t)$ is a parameter referred to as the learning rate;
- $F(t)$ is a performance function; and
- $e_i(t)$ is eligibility trace, configured to characterize relations between pre-synaptic I and post-synaptic activity j.

An exemplary eligibility trace may comprise a temporary record of the occurrence of an event, such as visiting of a state or the taking of an action, or a receipt of pre-synaptic input. The trace may mark the parameters associated with the event (e.g., the synaptic connection, pre- and post-synaptic neuron IDs) as eligible for undergoing learning changes. In some implementations, when a reward signal occurs, only eligible states or actions may be 'assigned credit' or 'blamed' for the error. The eligibility traces may aid in bridging the gap between the events and the training information.

Figure 2A:
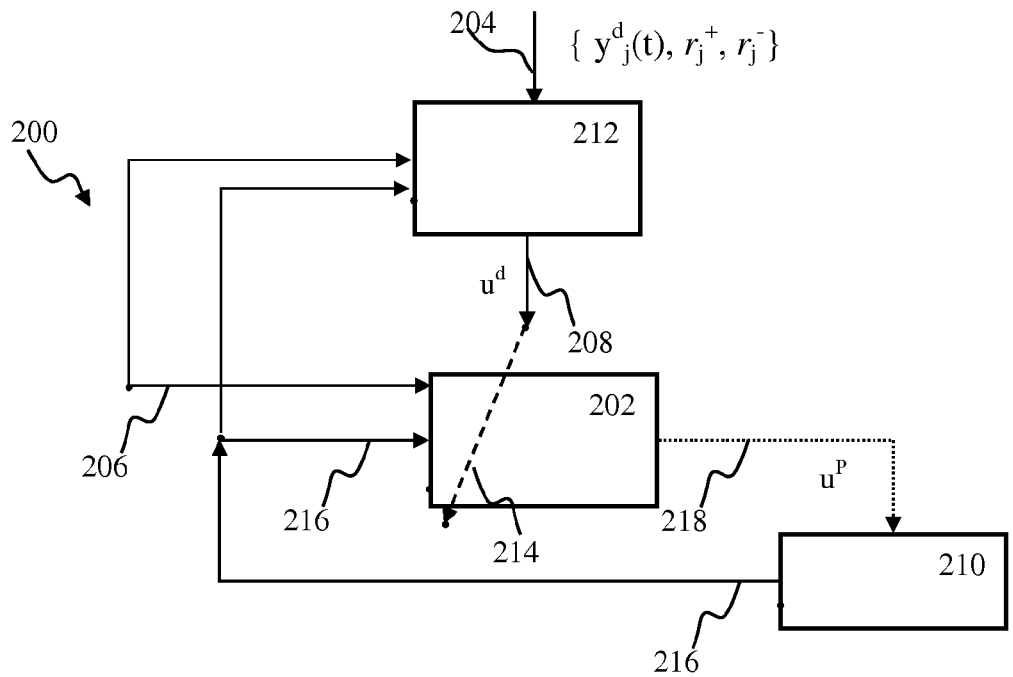
FIG. 2A is a block diagram illustrating an adaptive apparatus operable in accordance with reinforcement-guided supervised learning methodology, according to one or more implementations.
Figure 2B:
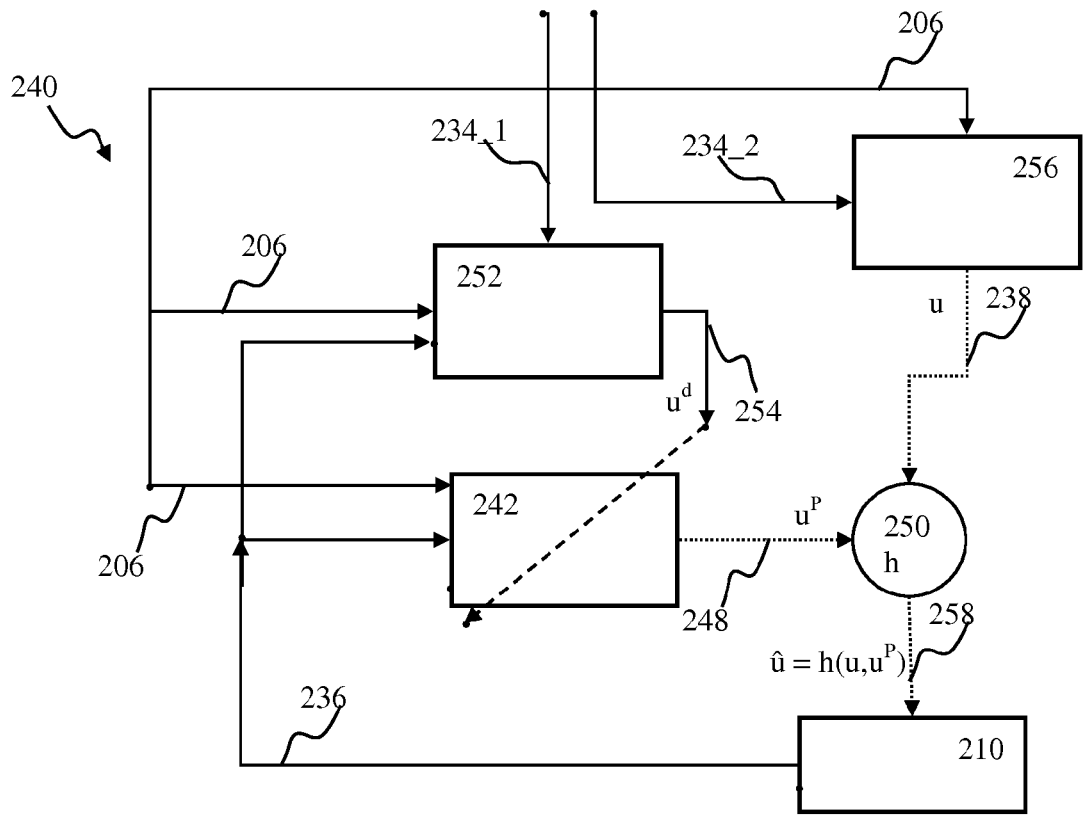
FIG. 2B is a block diagram illustrating an adaptive apparatus for reinforcement-guided supervised learning comprising a control signal combiner, according to one or more implementations.
Figure 2C:
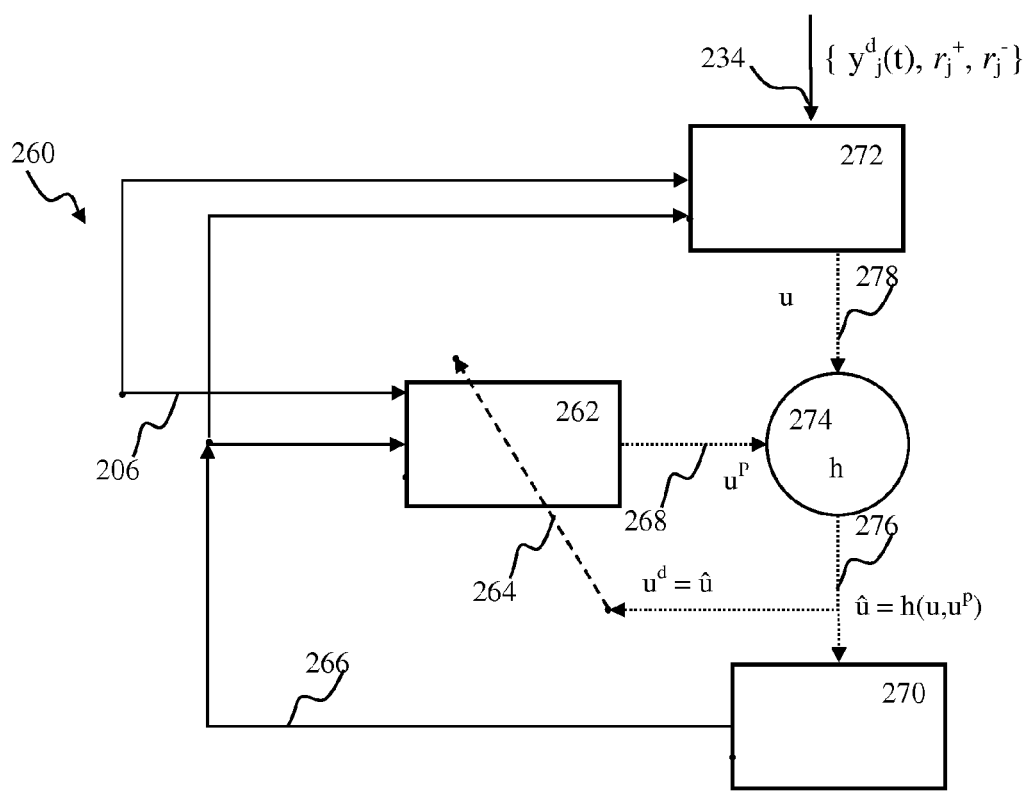
FIG. 2C is a block diagram illustrating an apparatus comprising an adaptable predictor block operable in accordance with a teaching signal produced by the control signal combiner, according to one or more implementations.
Figure 3:
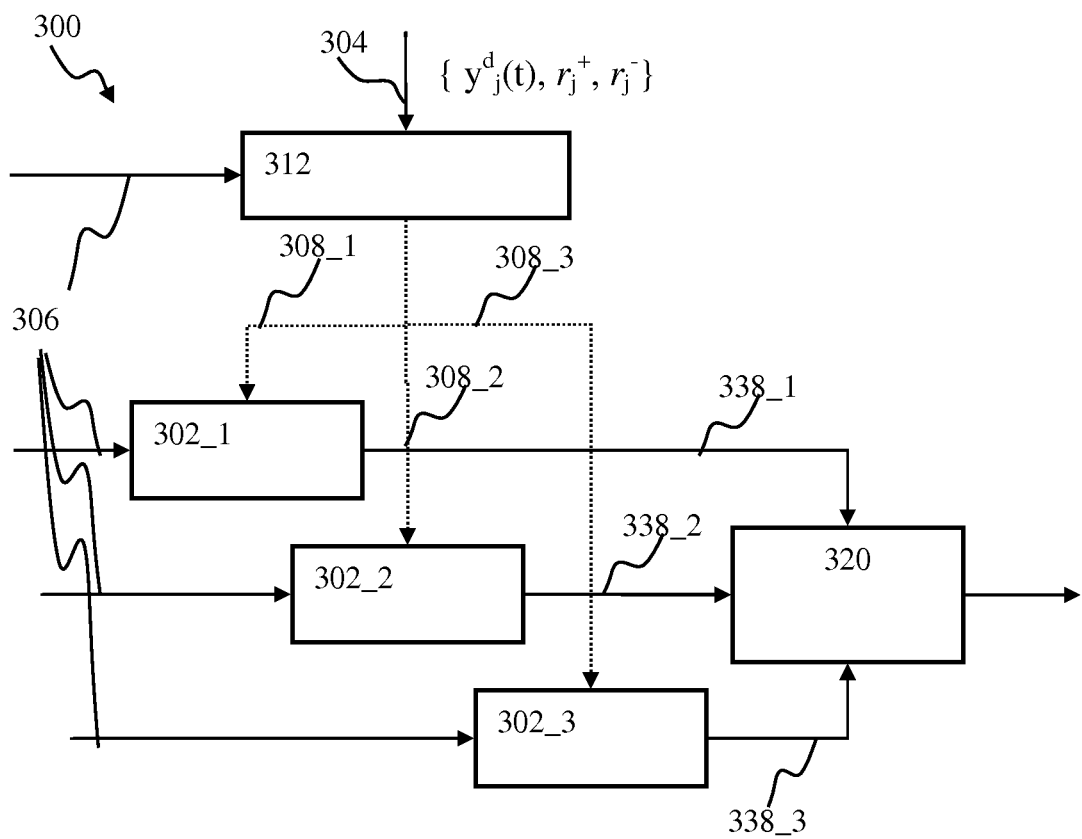
FIG. 3 is a block diagram illustrating an apparatus comprising a plurality of adaptable predictor blocks, according to one or more implementations.

FIGS. 2A-3 illustrate exemplary adaptive controller configurations comprising reinforcement-guided supervised learning in accordance with one or more implementations. The adaptive apparatus 200 of FIG. 2A may comprise an adaptive controller 212 and an adaptive predictor 202. The controller 212 and the predictor 202 may cooperate to produce a control signal 218 for the plant 210. In one or more implementations, the control signal 218 may comprise one or more motor commands (e.g., pan camera to the right, turn wheel to the left), sensor acquisition parameters (e.g., use high resolution camera mode), and/or other parameters.

The plant 210 of the system 200 may comprise an autonomous robotic vehicle, a robotic manipulator arm comprising one or more joints, and/or another robotic apparatus (e.g., a CNC milling machine). The controller 212 may comprise sufficient computational and/or memory resources for determining an optimal trajectory of the plant in accordance with a control policy (e.g., grasp a cup on a shelf without knocking off neighboring cups/objects). A given controller may be capable of learning (via reinforcement learning) a multitude of control tasks/trajectories (e.g., fill cup with water, serve coffee, navigate an office floor to collect refuse, and/or other tasks).

The controller (e.g., 212 in FIG. 2A) may comprise an adaptive system operable in accordance with a reinforcement learning process. Learning process of the controller 212 may be configured based on sensory input 206, external reinforcement signal 204, and/or plant feedback 216. The sensory input and/or the plant feedback may collectively be referred to as sensory context. The context may be utilized by the controller 212 in order to produce the teaching signal output 208. In one or more implementations, the learning process of the controller may comprise combination of reinforcement, supervised, and/or unsupervised learning, as described in co-owned and co-pending U.S. patent application Ser. No. 13/487,499 entitled "STOCHASTIC APPARATUS AND METHODS FOR IMPLEMENTING GENERALIZED LEARNING RULES, incorporated supra.

The predictor 202 in FIG. 2A may comprise an adaptive system operable in accordance with a supervised learning process. Learning processes of the predictor 202 may be configured based on the sensory input 206, teaching signal 214, plant feedback 216, and/or other information. Output 208 of the controller may be utilized as the teaching signal 214. In one or more implementations, the teaching signal may comprise an error signal configured based on current predictor output and target output for the predictor.

In one or more implementations wherein the predictor may comprise a spiking neuron network (e.g., the network 120 of FIG. 1B) operable in accordance with a learning process, the training signal $u^d = \overline{S}^d$ may be used to adjust one or more operational parameters $\theta$ of the learning process, as described for example in co-owned U.S. patent application Ser. No. 13/761,090, entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, incorporated supra:

$$\frac{d\theta_{jk}(t)}{dt} = \eta(t)(\overline{S_j^d}(t) - \overline{S_j}(t))\overline{S_k}(t) \quad \text{(Eqn. 8)}$$

where:
- $\theta_{jk}(t)$ is the efficacy of the synaptic connection from the pre-synaptic neuron i to neuron j;
- $\eta(t)$ is the learning rate;
- $\overline{S_j^d}(t)$ is low-pass filtered version of the target spike train for neuron j, with a filter time constant $\tau_j^d$;
- $\overline{S_j}(t)$ is the low-pass filtered version of the output spike train from neuron j, with a filter time constant $\tau_j$; and
- $\overline{S_k}(t)$ is the low-pass filtered version of the i-th input spike train to neuron j, with a filter time constant $\tau_i$.

In some implementations (including the implementation of Eqn. 8), the low-pass filtered version of the spike train may be expressed as:

$$\overline{S_k}(t) = \int_0^\infty a_k(s) S_k(t-s) ds, \quad \text{(Eqn. 9)}$$

with a(s) being a smoothing kernel. In one or more variants, the smoothing kernel may comprise an exponential, Gaussian, and/or another function of time, configured using one or more parameters. Further, the parameters may comprise a filter time constant $\tau$. An example of an exponential smoothing kernel is:

$$a_k(s) = \exp(-s/\tau), \quad \text{(Eqn. 10)}$$

where $\tau$ is the kernel time constant.

In one or more implementations, the learning rate $\eta$ of Eqn. 8 may be configured to vary with time, as described in detail in co-pending U.S. patent application Ser. No. 13/722,769 filed Dec. 20, 2012, and entitled "APPARATUS AND METHODS FOR STATE-DEPENDENT LEARNING IN SPIKING NEURON NETWORKS", the foregoing being incorporated herein in its entirety.

In some implementations, in order to reduce cost, size, and/or resource (e.g., energy) use, it may be desired to configure the controller resources to match one or more target control trajectories. Avoiding having a substantial spare resource capacity in an autonomous robot may be advantageous for enabling longer autonomy, lower cost, better user experience, and/or wider use. Under the constraint of available resources, the controller may be configured to solve a certain given number of control tasks simultaneously. Resource-optimized controller may not have sufficient resources for executing additional (e.g., unexpected) control tasks. Such tasks may arise due to, for example, unexpected sensory input (e.g., an additional object appearing in front of the manipulator), sensory malfunction (e.g., one camera feed going blank), a user desire to perform two or more tasks simultaneously, and/or other circumstances. By way of a non-limiting illustration, it may be desired to increase exploration rate by, e.g., directing an exploration robot to placing an object into a container with a manipulator while traversing to another target.

In one or more implementations, the predictor apparatus 202 may comprise a plurality of predictor blocks (e.g., 302 in FIG. 3), wherein individual predictors are operable in accordance with a respective supervised learning process. Individual predictors may comprise fewer resources compared to the controller 212, 312 in FIGS. 2A, 3, respectively. In some realizations, predictor may utilize 10-1000 times fewer resources (e.g., blocks 1140, memory 1134, and/or micro blocks 1154, 1152, 1156) when compared to the resource capability of the controller 212.

Figure 4:
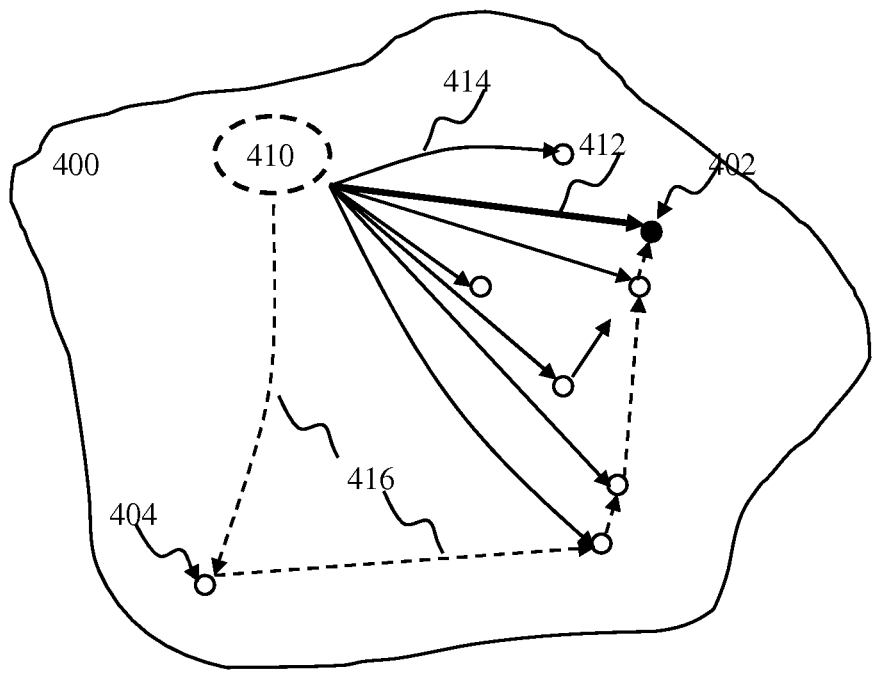
FIG. 4 is a graphical illustration depicting reinforcement learning control process of, e.g., controller of FIG. 2A, characterized by state space comprising two or more local minima, in accordance with one or more implementations.
Figure 5:
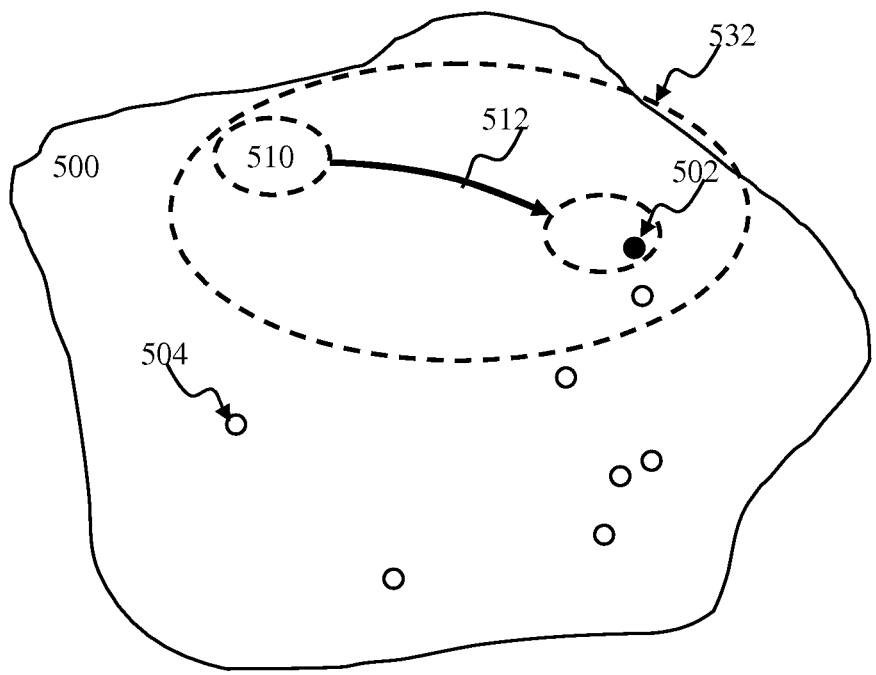
FIG. 5 is a graphical illustration depicting supervised learning control process of, e.g., adaptive predictor of FIG. 2A, characterized by state space comprising two or more local minima, in accordance with one or more implementations.

Resource use and computational load associated with operating reinforcement learning process of the controller (e.g., 212 in FIG. 2A) and/or supervised learning process of the predictor (e.g., 202 in FIG. 2A) are described with respect to FIGS. 4-5.

FIG. 4 illustrates state-space 400 of a cost function (also referred to as a performance function) that may be associated with operation of a robotic device (e.g., a rover and/or a manipulator). The state-space 400 may be characterized by one or more states. In some implementations, the one or more states may comprise motion parameters (e.g., spatial coordinates, velocity and/or acceleration) of individual joints, wheels, motor parameters (e.g., current draw, friction), energy use, and/or other parameters.

In some implementations comprising cost function minimization, the cost function may comprise a global minimum 402 and one or more local minima 404 disposed within the state-space 400. The learning process associated with the cost function 400 may be operable in one or more training iterations (or epochs). In some implementations of reinforcement learning, the control process may explore the state space in two or more epochs. During a given epoch, the learning process may be capable of locating an optimal solution (e.g., cost function minimum) within a state space extent denoted by broken curve 410. The extent state-space extent 410 of a given epoch may comprise a fraction (e.g., 1%-10% in some realizations). Reinforcement signal may be utilized by the controller reinforcement learning control in order to aid the exploration and to transition the process towards the global minimum 402.

Responsive to the state space comprising multiple local minima that may be spread apart by distance greater than the spatial extent 410, multiple exploration trajectories 414 may exist. As shown in FIG. 4, a learning trajectory (dented by broken line curves 416) may comprise traverse through one or more local minima prior to arrival to the optimal solution (global minimum), in one or more implementations. Determination of the trajectory 416 may take a longer time and/or may consume more resources compared to the determination of the trajectory 412. Computational resources (of, e.g., the controller 212) may be configured commensurate with the state space size, number of minima, and/or learning trajectory dimension in order to determine an optimum outcome of the reinforcement learning process associated with the state space 400 of FIG. 4.

FIG. 5 illustrates solution determination within the state space 500 using reinforcement learning. The cost function of the state space 500 may comprise a global minimum 502 and one or more local minima 504 disposed within the state-space 400. The learning process associated with the cost function 500 may be operable in one or more training iterations (or epochs). In some implementations of reinforcement learning, the control process may explore the state space in two or more epochs. During a given epoch, the learning process may be capable of locating an optimal solution (e.g., cost function minimum) within a state space extent denoted by broken curve 510. Supervisory (e.g., a training) signal may be utilized in order to guide the learning process (of, e.g., predictor 202) towards the target solution (e.g., the global minimum 502). In some implementations, based on prior training, the teaching agent (e.g., the controller 212) may comprise knowledge related to the estate space 500 that is greater that the exploration space extent 510. Previously learned knowledge of the state-space by the controller is illustrated by the broken curve 532. In some learn-to-navigate implementations, the term knowledge may refer to a learned mapping between the sensory and contextual information and the appropriate motor commands for navigation. In some implementations, the knowledge may refer to state-to-action transformation performed during the traverse of the trajectories 416 in FIG. 4 and/or trajectories 612, 618 in FIG. 6. The state-to-action transformation may comprise a link between given state and the action performed for that state.

Previously learned knowledge of the state-space, may enable the controller to provide a teaching signal to the predictor learning process so as to guide it along the trajectory 512 towards the target solution.

Returning now to FIG. 2A, the controller 212 may be configured to generate output signal $u^d$ 208 based on one or more of (i) sensory input (denoted 206 in FIG. 2A) and/or (ii) plant feedback 216. In some implementations, the plant feedback may comprise proprioceptive signals, such as the readings from servo motors, joint position, and/or torque. In some implementations, the sensory input 206 may correspond to the controller sensory input 106, described with respect to FIG. 1A, supra.

The adaptive predictor 202 may be configured to generate predicted control signal $u^P$ 218 based on one or more of (i) the sensory input 206, and/or (ii) the plant feedback 216; (iii) and a teaching signal 214. In some implementations, such as reinforcement-guided supervised learning shown in FIG. 2A, the teaching signal 214 may comprise the output 208 of the controller 212. In one or more implementations, the predicted control signal 218 may comprise one or more motor commands (e.g., pan camera to the right, turn wheel to the left), sensor acquisition parameters (e.g., use high resolution camera mode), and/or other parameters. Predictor realizations, comprising plant feedback (e.g., 216, 236 in FIGS. 2A-2B, respectively), may be employed in applications such as, for example, wherein (i) the control action may comprise a sequence of purposefully timed commands (e.g., associated with approaching a stationary target (e.g., a cup) by a robotic manipulator arm); and (ii) the plant may be characterized by a plant state time parameter (e.g., arm inertia, and/or motor response time) that may be greater than the rate of action updates. Parameters of a subsequent command within the sequence may depend on the plant state (e.g., the exact location and/or position of the arm joints) that may become available to the predictor via the plant feedback.

The predictor 202 may be configured to adapt its internal parameters, e.g., according to a supervised learning rule, and/or other machine learning rules. In some predictor implementations comprising spiking neuron networks, the adaptation may comprise synaptic weight adjustments of, e.g., Eqn. 8.

In one or more implementations, the plant 210 may be characterized by plant transfer function f(x) that may be function of sensory input x. The predictor 202 may be characterized by predictor transfer function g(x). The controller 212 of the control system 200, may effectuate learning of a combined transfer function of the plant—predictor in order to produce control output û consistent with the sensory input x. In some implementations, the combination may comprise a convolution expressed as:

$$u^P(x)=[f(x)*\hat{g}(x)]\cdot x, \quad \text{(Eqn. 11)}$$

wherein ĝ(x) denotes adaptation of the predictor transfer function through supervised learning. In some realizations, the controller 212 may be capable of producing the teaching signal 214 configured to cause modifications of the predictor transfer function g(x) such that the combined system (e.g., the controller 212/the predictor 202 characterized by the transfer function combination f(x)*g(x)) may follow target control policy. In some realization, the target control policy may be configured based on a minimization of a given cost function based on the input signal x. Upon training, the output of such combined system (e.g., as determined by Eqn. 11) may comprise an optimal output given the cost function and the input.

FIG. 2B illustrates a control apparatus 240 comprising an adaptable predictor block 242, operable in accordance with a supervised learning process, and two controllers 252, 256. The controllers 252, 256 may be operable in accordance with a reinforcement learning process, based on an external signal 234. In some implementations, the signal 234 may be configured to provide reward and/or punishment signals from the external environment. By way of illustration, a mobile robot, controlled by spiking neural network, may be configured to collect resources (e.g., clean up trash) while avoiding obstacles (e.g., furniture, walls). In this example, the signal 234, expressed for example by Eqn. 1, may comprise a positive indication (e.g., representing a reward) responsive to the robot acquiring the resource (e.g., picking up a piece of rubbish); and a negative indication (e.g., representing a punishment) responsive to the robot colliding with an obstacle (e.g., wall). Upon receiving the reinforcement signal 234, the spiking neural network of the robot controller 252, 256 may change its parameters (e.g., neuron connection weights) in order to maximize control policy performance function (e.g., maximize the reward and minimize the punishment). In some realizations of such robotic controller, the external signal 234 may comprise positive and/or negative reward. In some implementations, such as, for example, comprising multiple control objectives, the controllers 252, 256 may receive reinforcement signals 234_1, 234_2 configured separate from one another. By way of a non-limiting illustration of obstacle avoidance (OA) and target approach (TA) one of the controllers (e.g., 256 in FIG. 2B) may receive reinforcement signal configured based on a cost function for the combined objective (e.g., approach individual targets while avoiding contact with obstacles). Another controlled (e.g., e.g., 252 in FIG. 2B) may be configured to receive reinforcement signal that is based on the cost function configured solely for the target approach objective. In some realizations, individual reinforcement signals may be used to enable training of individual predictors to solve individual sub-tasks (e.g., identify, approach, avoid) of a composite task (e.g., picking a ripe orange from a tree).

In one or more implementations, the external signal 234 may comprise two or more states:
(i) a base state (i.e., zero reinforcement, signified, for example, by absence of signal activity on the respective input channel, zero value in of register or variable etc.). The zero reinforcement state may correspond, for example, to periods when network activity has not arrived at an outcome, e.g., the robotic arm is moving towards the desired target; or when the performance of the system does not change or is precisely as predicted by the internal performance predictor (as for example described in co-owned U.S. patent application Ser. No. 13/238,932 filed Sep. 21, 2011 and entitled "ADAPTIVE CRITIC APPARATUS AND METHODS" incorporated supra); and
(ii) first reinforcement state (i.e., positive reinforcement, signified for example by a positive amplitude pulse of voltage or current, binary flag value of one, a variable value of one, etc.). Positive reinforcement is provided when the network operates in accordance with the desired signal, e.g., the robotic arm has reached the desired target, or when the network performance is better than predicted by the performance predictor, as described for example in co-owned U.S. patent application Ser. No. 13/238,932, referenced supra.

In one or more implementations, the external signal may comprise a third reinforcement state (i.e., negative reinforcement) signified, for example, by a negative amplitude pulse of voltage or current, a variable value of less than one (e.g., −1, 0.5, etc.). Negative reinforcement may be provided responsive to the network failing to operate in accordance with the desired signal, e.g., the robotic arm has reached wrong target, and/or responsive to the controller current performance (e.g., a distance to target) being worse than target distance.

Returning now to FIG. 2B, one controllers (e.g., 252) of the control system 240 may be configured to provide teaching signal 254 to the predictor 242. The controller 256 may be configured to provide a control signal 238 to the predictor 242. In one or more implementations, the controller 252 and/or 256 operation may comprise reinforcement learning process, described in detail with respect to the controller 212, supra, and based on sensory input 206 and/or reinforcement signal 234.

The control system 240 may comprise a combiner 250. The controllers 252, 256, the predictor 242 and the combiner 250 may cooperate to produce the plant control signal 258.

The combiner 250 may implement a transfer function h( ) configured to combine the initial controller output 238 and the predicted controller output 248. In some implementations, the combiner 250 operation may be expressed as follows:

$$\hat{u}=h(u,u^P). \quad \text{(Eqn. 12)}$$

Various realization of the transfer function of Eqn. 12 may be utilized. In some implementations, the transfer function may comprise addition operation, union, a logical 'AND' operation, and/or other operations.

In one or more implementations, the transfer function may comprise a convolution operation. In spiking network realizations of the combiner function, the convolution operation may be supplemented by use of a finite support kernel such as Gaussian, rectangular, exponential, and/or other finite support kernel. Such a kernel may implement a low pass filtering operation of input spike train(s). In some implementations, the transfer function may be characterized by a commutative property configured such that:

$$\hat{u}=h(u,u^P)=h(u^P,u). \quad \text{(Eqn. 13)}$$

In one or more implementations, the transfer function of the combiner 250 may be configured as follows:

$$h(0,u^P)=u^P. \quad \text{(Eqn. 14)}$$

In one or more implementations, the transfer function h may be configured as:

$$h(u,0)=u. \quad \text{(Eqn. 15)}$$

In some implementations, the transfer function h may be configured as a combination of realizations of Eqn. 14-Eqn. 15 as:

$$h(0,u^P)=u^P, \text{ and } h(u,0)=u, \quad \text{(Eqn. 16)}$$

In one exemplary implementation, the transfer function satisfying Eqn. 16 may be expressed as:

$$h(u,u^P)=(1-u)\times(1-u^P)-1. \quad \text{(Eqn. 17)}$$

In some implementations, the combiner transfer function may be characterized by a delay expressed as:

$$\hat{u}(t_{i+1})=h(u(t_i),u^P(t_i)). \quad \text{(Eqn. 18)}$$

In Eqn. 18, $\hat{u}(t_{i+1})$ denotes combined output (e.g., 258 in FIG. 2B) at time t+Δt. As used herein, symbol $t_N$ may be used to refer to a time instance associated with individual controller update events (e.g., as expressed by Eqn. 18), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

It will be appreciated by those skilled in the arts that various other realizations of the transfer function of the combiner 250 (e.g., comprising a Heaviside step function, a sigmoidal function, such as the hyperbolic tangent, Gauss error function, or logistic function, and/or a stochastic operation) may be applicable.

The sensory input and/or the plant feedback may collectively be referred to as sensory context. The context may be utilized by predictor 202, 242 in order to produce the predicted control signal 218, 248. By way of a non-limiting illustration of obstacle avoidance by an autonomous rover, an image of an obstacle (e.g., wall representation in the sensory input 206) may be combined with rover motion (e.g., speed and/or direction) to generate Context_A. When the Context_A is encountered, the control output 218, 248 may comprise one or more commands configured to avoid a collision between the rover and the obstacle. Based on one or more prior encounters of the Context_A—avoidance control output, the predictor may build an association between these events as described below.

In some implementations, the predicted signal may be characterized by a temporal distribution that may differ from temporal distribution of the teaching signal. Various temporal distributions may be utilized with the predictor signal, such as, for example uniform, power law decay, linear, and/or other realizations. It is noteworthy that in some realizations, predictor output (at time t1) may comprise non-zero signal even responsive to receipt of zero teaching signal at time t1 and based on non-zero teaching signal prior to t1. In some implementations, zero teaching signal may be used to indicate that the predictor output (e.g., 218 in FIG. 2A) is configured to cause the target action by the plant.

Control output generation by predictor (e.g., 202, 242 in FIGS. 2A-2B) may be effectuated via two or more trials. During individual trials, predictor output may be adjusted based on the teaching signal. Responsive to the predictor being capable of producing the target output, the controller output (e.g., 238, in FIG. 2B) may be withdrawn (removed). Responsive to the predictor being capable of producing the target output, the teaching signal (e.g., 214, in FIG. 2A) may comprise zero signal. FIG. 2C illustrates a control apparatus 260 comprising an adaptable predictor 262 operable in accordance with a learning process that is based on a teaching signal, according to one or more implementations.

The learning process of the adaptive predictor 262 may comprise supervised learning process, reinforcement learning process, and/or a combination thereof. The learning process of the predictor 262 may be configured to generate predictor output 268. The control block 272, the predictor 262, and the combiner 274 may cooperate to produce a control signal 276 for the plant 270. In one or more implementations, the control signal 276 may comprise one or more motor commands (e.g., pan camera to the right, turn wheel to the left), sensor acquisition parameters (e.g., use high resolution camera mode), and/or other parameters.

The adaptive predictor 262 may be configured to generate predicted controller output $u^P$ 268 based on one or more of (i) the sensory input 206, (ii) the plant feedback 266, and/or other information. Predictor realizations, comprising plant feedback (e.g., 216, 266 in FIGS. 2A-2C, respectively), may be employed in applications such as, for example, wherein (i) the control action may comprise a sequence of purposefully timed commands (e.g., associated with approaching a stationary target (e.g., a cup) by a robotic manipulator arm); and (ii) the plant may be characterized by a plant state time parameter (e.g., arm inertia, and/or motor response time) that may be greater than the rate of action updates. Parameters of a subsequent command within the sequence may depend on the plant state (e.g., the exact location and/or position of the arm joints) that may become available to the predictor via the plant feedback.

Operation of the predictor 262 learning process may be aided by a teaching signal 264. As shown in FIG. 2C, the teaching signal 264 may comprise the output 276 of the combiner:

$$d^d=\hat{u}. \quad \text{(Eqn. 19)}$$

In some implementations wherein the combiner transfer function may be characterized by a delay, the teaching signal at time $t_i$ may be configured based on values of $u$, $u^P$ at a prior time $t_{i-1}$, for example as:

$$u^d(t_i)=h(u(t_{i-1}),u^P(t_{i-1})). \quad \text{(Eqn. 20)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1})=F[x_i,W(u^d(t_i))]. \quad \text{(Eqn. 21)}$$

In Eqn. 21, the function W may refer to a learning process implemented by the predictor.

Returning now to FIG. 2C, the combiner 274 may implement a transfer function h( ) configured to combine the controller output 278 and the predicted controller output 268. In various implementations, operation of the combiner 274 may be configured in accordance with Eqn. 12-Eqn. 18, described above and/or other relations. In one such realization, the combiner 274 transfer function may be configured according to Eqn. 22, thereby implementing an additive feedback. In other words, output of the predictor (e.g., 268) may be additively combined with the output of the controller (278) and the combined signal 276 may be used as the teaching input (264) for the predictor.

In one or more implementations, such as illustrated in FIGS. 2A-2C, the sensory input 206, the controller output 238, 278, the predicted output 218, 248, 268, the combined output 258, 276 and/or plant feedback 216, 266 may comprise spiking signal, analog signal, and/or a combination thereof. Analog to spiking and/or spiking to analog signal conversion may be effectuated using, mixed signal spiking neuron networks, such as, for example, described in U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-pending U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, incorporated supra.

Exemplary operation of the adaptive control system (e.g., 200, 220 of FIGS. 2A-2B) is now described in detail. The predictor and/or the controller of the adaptive system 200, 220 may be operated in accordance with an update process configured to be effectuated continuously and/or at discrete time intervals $\Delta t$, described above with respect to Eqn. 18.

The control output (e.g., 224 in FIG. 2A) may be provided at a rate between 1 Hz and 1000 Hz. A time scales $T_{plant}$ describing dynamics of the respective plant (e.g., response time of a rover and/or an aerial drone platform, also referred to as the behavioral time scale) may vary with the plant type and comprise scales on the order of a second (e.g., between 0.1 s to 2 s).

The transfer function of the combiner of the exemplary implementation of the adaptive system 200, 220, described below, may be configured as follows:

$$\hat{u} = h(u, u^P) = u + u^P. \qquad \text{(Eqn. 22)}$$

Training of the adaptive predictor (e.g., 202 of the control system 200 of FIG. 2A) may be effectuated via a plurality of trials. In some implementations, training of a mechanized robot and/or an autonomous rover may comprise between 5 and 50 trials. Individual trials may be configured with duration that may be sufficient to observe behavior of the plant (e.g., execute a turn and/or another maneuver), e.g., between 1 and 10 s.

In some implementations the trial duration may last longer (up to tens of second) and be determined based on a difference measure between current performance of the plant (e.g., current distance to an object) and a target performance (e.g., a target distance to the object). The performance may be characterized by a performance function as described in detail in co-owned and co-pending U.S. patent application Ser. No. 13/487,499 entitled "STOCHASTIC APPARATUS AND METHODS FOR IMPLEMENTING GENERALIZED LEARNING RULES, incorporated supra. Individual trials may be separated in time (and in space) by practically any duration commensurate with operational cycle of the plant. By way of illustration, individual trial when training a robot to approach objects and/or avoid obstacles may be separated by a time period and/or space that may be commensurate with the robot traversing from one object/obstacle to the next. In one or more implementations, the robot may comprise a rover platform, and/or a robotic manipulator arm comprising one or more joints.

The predictor 202, 242, 262 of the adaptive control system 200, 240, 260 of FIGS. 2A-2C may comprise a spiking neuron network (comprising for example the neuron 140 of FIG. 1B above) configured to implement reinforcement and/or supervised learning described with respect to FIG. 1B above.

The training signal (e.g., 264 in FIG. 2C) may be configured to inform the predictor about the combined output to the plant. This configuration may enable the predictor 262 to adjust the predicted output 268 to match the target output 276 more rapidly, compared to the predictor output in the absence of the training signal (e.g., output 218 of FIG. 2A).

Some existing adaptive controllers avoid using controller output as the teaching input into the same system, as any output drift and/or an erroneous output may be reinforced via learning, resulting in a drift, e.g., growing errors with time, in the outputs of the learning system.

Control configuration (e.g., such as illustrated in FIG. 2C) wherein output of the predictor may be fed back to the predictor as a teaching signal, may advantageously reduce susceptibility of the control system (e.g., 260 in FIG. 2C) to drift and/or DC bias. For example, responsive to absence of controller output 278, the teaching signal may comprise a copy of the predictor output. In some implementations, responsive to the predictor output matching the target signal, predictor state may remain unchanged (e.g., no adaptation) due to zero error. In one or more implementations characterized by the predicted signal 268 drift, the controller may generate a correction signal. The controller output (e.g., 278) may be combined with the predictor output 268 to generate the teaching signal 264 thereby removing the drift.

The combiner 274 of the adaptive system 260 may be operated in accordance with the transfer function expressed, for example via Eqn. 18. An exemplary training sequence of adaptive system 260 operation, comprising the predictor training input 264 of FIG. 2C may be expressed as follows:

During first trial at time T1:
  the controller may receive a sensory input (e.g., 206, 226 in FIG. 2B) containing x1 and may generate output u1;
  the predictor may receive the sensory input x1 (or a portion of thereof), and may be configured to generate predicted control signal (e.g., $u1^P=0°$);
  the combiner may produce the combined output $\hat{u}1=45°$; this output may be provided to the predictor as the teaching (target) signal at a subsequent time instance; and
  the plant 270 may begin to execute a right turn in accordance with the combined control signal (e.g., 258 in FIG. 2B) $\hat{u}1=45°$.

During another trial at time T2>T1:
  the controller may receive a sensory input (e.g., 206, 266 in FIG. 2C) containing x1 and may generate output u2=45°;
  the predictor may receive the sensory input x1 (or a portion of thereof), and the teaching (target) signal $\hat{u}1=45°$ produced by the combiner at a prior trial (e.g., T1); the predictor may be configured to 'mimic' the combined output $\hat{u}$; the predictor may be configured to generate predicted control signal (e.g., $u2^P=30°$) based on the sensory input, plant feedback and/or the teaching signal;
  the combiner may produce the combined output $\hat{u}2=75°$ (e.g., in accordance with, for example, Eqn. 18); and
  the plant 270 may increase the turn rate with the control signal $\hat{u}2$.

During another trial at time T3>T2:
  the controller may determine that the rate of turn is in excess of the target turn of 45°, and may generate control output u3=0°;
  the predictor may receive the sensory input x (or a portion of thereof), and the teaching (target) signal $\hat{u}2=75°$ produced by the combiner at a prior trial (e.g., T2); the predictor may be configured to generate predicted control signal (e.g., u3P=50°) based on the sensory input, plant feedback and/or the teaching signal;
  the combiner may produce the combined output $\hat{u}3=50°$ (e.g., in accordance with, for example, Eqn. 18); and
  the plant 270 may execute the turn in accordance with the control signal $\hat{u}3$.

Subsequently, at times T4, T5, TM>T2 the predictor output to the combiner 234 may result in the control signal (e.g., 268 in FIG. 2C) to cause the plant to turn by 45° and the controller output 278 may be reduced to zero. In some implementations, the outcome of the above operational sequence may be referred to as (gradual) transfer of the controller output to the predictor output. When the predictor is capable to producing the target output, the controller output (e.g., 278 in FIG. 2C) may be withdrawn (removed). The output 276 of the combiner (e.g., 276) may comprise the predictor output in accordance with, for example, Eqn. 14.

In one or more implementations comprising spiking control and/or predictor signals (e.g., 238, 278, 248, 268 in FIGS. 2B-2C), the withdrawal of the controller output may correspond to the controller (e.g., 256 in FIG. 2B) generating spike output at a base (background) rate. By way of illustration, spike output at a (background) rate of 2 Hz may correspond to 'maintain course' control output; output above 2 Hz may indicate a turn command. The turn rate may be encoded as spike rate, number of spikes, and/or spike latency in various implementations. In some implementations, zero output (e.g., controller output 238, predictor output 248, and/or combiner output 258) may comprise a 'zero signal', such as a predefined signal, a constant (e.g., a dc offset or a bias), spiking activity at a mean-firing rate, and/or other zero signal.

FIG. 3 illustrates a control apparatus 300 comprising an adaptable controller 312 and multiple adaptable predictors 302. The controller 312 may be operable in accordance with sensory input 306 using any applicable reinforcement learning methodologies described above with respect to FIGS. 2A-2C. The controller 312 learning process may be based on the external teaching signal 304.

Individual predictors may be operable in accordance with sensory input 306 using any applicable supervised learning methodologies described above with respect to FIGS. 2A-2C. The predictor 302 learning process may be based on the respective teaching signals 308 produced by the controller 312.

By way of a non-limiting illustration, control apparatus configuration 300 shown and described with respect to FIG. 3 may be utilized in a control application wherein the controller 312 may be utilized to train two or more predictors 302 to perform individual control tasks. In some implementations of an exploration robot, such tasks may comprise one or more of navigating the robot to a target area; rotating camera towards and area of interest; adjusting camera lens zoom, aperture, and/or focus; identifying a sample in sensory input; activating a manipulator to approach and grab the sample; and/or other tasks. Due to resource optimization described supra, the controller may be unable to perform several of the tasks contemporaneously with one another. In order to perform the exploration mission, the controller apparatus 300 may be configured to comprise multiple predictors 302. The controller 312 may be configured to train individual predictors to perform a respective task (e.g., place the sample into sample container).

Upon learning task T, the predictor may be characterized by predictor state Q(T). In some implementations, the predictor state may comprise one (or more) of: neuron network configuration (e.g., number and/or type of neurons and/or neuron connectivity), neuron states (excitability), connectivity (e.g., efficacy of connections), and/or other information. In some implementations, the network configuration may comprise neuron state parameter characterizing neuron intrinsic plasticity. In one or more implementations, the predictor state may comprise one or more lookup tables (e.g., as described in U.S. patent application Ser. No. 13/842,562 entitled "ADAPTIVE PREDICTOR APPARATUS AND METHODS FOR ROBOTIC CONTROL", incorporated supra), a database comprising one or more tables; and/or a hash-table. In some implementations, the predictor state may comprise a bit-file configured to characterize machine code and/or memory content of the predictor processing apparatus (e.g., a processing core, a CPU, a DSP, and/or FPGA). In some implementations of a predictor comprising a spiking neuron network, the association information may comprise one or more network connectivity, neuron state, and/or connection efficacy (e.g., weights). The learned predictor state Q(T) may be stored in, for example, shared memory 1106, 1108 of FIG. 11A, and/or cell memory 1134 of FIG. 11B. In one or more implementations, the predictor state may be stored in a commonly available storage (e.g., 1108 and/or 1106 of FIG. 11A).

During operation, the control apparatus 300 may initialize individual predictors with predictor states corresponding to respective tasks. Individual predictors may be operable to generate control output 338 in accordance with sensory input 306 using any applicable supervised learning methodologies described above with respect to FIGS. 2A-2C. The predictor 302 learning process may be based on the respective teaching signals 308 produced by the controller 312.

Control output of individual predictors 302 may be routed via an arbitration apparatus 320. The arbitrator 320 may be utilized to gate, prioritize and/or otherwise resolve scheduling conflicts that may arise responsive to two (or more) predictors attempting to control the same set of plant resources (e.g., rotate the same wheel). Output of the he arbitrator 320 may be directed to a plant.

In some implementations, it may be desirable to add new functionality (e.g., enable a ROOMBA® robotic cleaner to perform a new task, e.g., dust blinds and/or detect cold drafts in windows) to an existing robot. In some realizations, hardware platform of the existing robot may be optimized for a given set of tasks and may not be capable (due to, e.g., memory and/or computational capacity limitations) of performing additional tasks (e.g., searching for cold drafts) cotemporaneous with the execution of other tasks e.g., vacuuming). of For example, it may be desirable to reinforcement-guided supervised learning methodology of the present disclosure for training of an autonomous robotic apparatus In some implementations, it may be desirable to add new functionality to an existing robot. For example, it may be desirable to enable a ROOMBA® robotic cleaner to perform a new task, e.g., water plants and/or detect cold drafts in windows. A hardware platform of the existing robot may be optimized for a given set of tasks and may not be capable (due to, e.g., memory and/or computational capacity limitations) of performing additional tasks (e.g., searching for cold drafts) cotemporaneous with the execution of other tasks (e.g., vacuuming).

Figure 6:
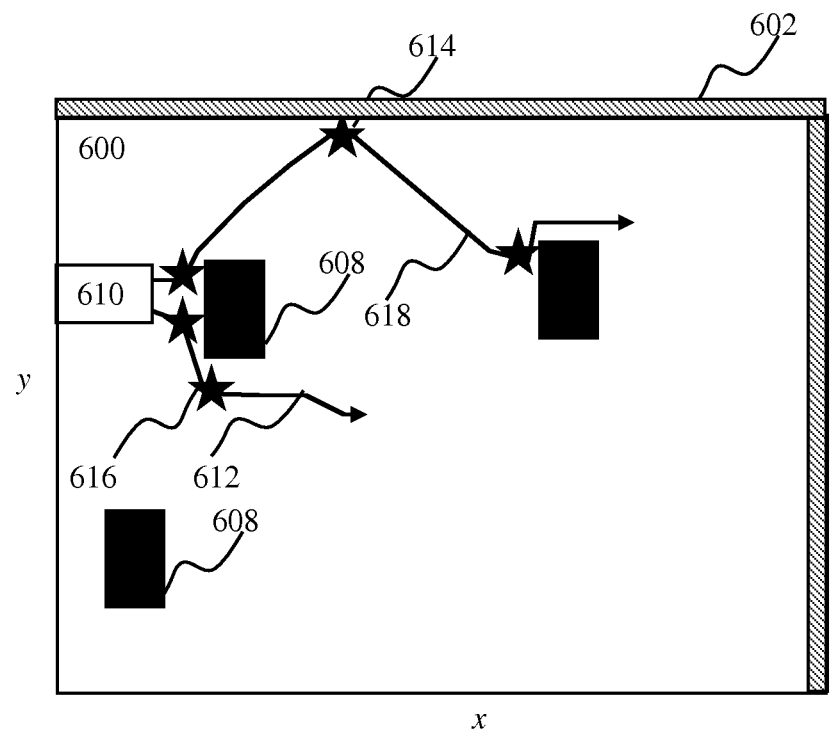
FIG. 6 is a graphical illustration depicting exemplary trajectories of a robotic device during training, in accordance with some implementations.
Figure 6:
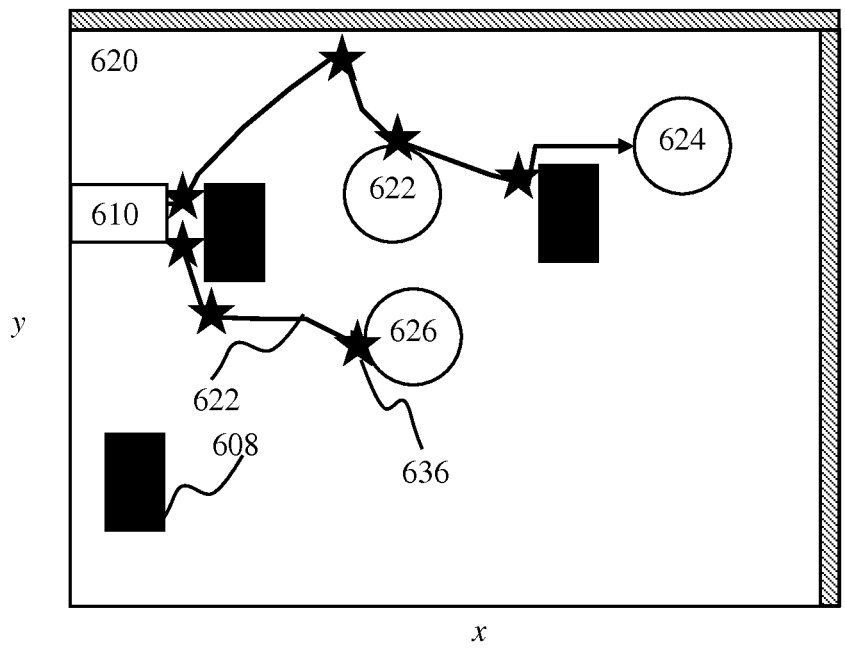

FIG. 6 illustrates use of reinforcement-guided supervised learning methodology of the present disclosure for training of an autonomous robotic apparatus to perform two or more tasks so as to enable functionality expansion.

Panel 600 in FIG. 6 illustrates trajectories 612, 618 of a robotic device 610 during training. In some implementations, the robotic device may comprise an autonomous robot (e.g., a ROOMBA®). The robotic device 610 may comprise a controller operable in accordance with reinforcement learning process configured based on a cost function. The environment (e.g., shown by the rectangle 600 in FIG. 6) may comprise one or more obstacles 608 and/or walls 602. The training may comprise obstacle avoidance training based on one or more reinforcement events depicted by stars 614. The cost function may comprise cost-to-go that may be described as a cumulative of immediate costs C, along a trajectory (e.g., the trajectory 612, 618 in FIG. 6). In some implementations, the immediate costs $C_i$ may be determined using one or more reinforcement indications 614, 616 using methodology described in detail in U.S. patent application Ser. No. 13/841, 980 entitled "ROBOTIC TRAINING APPARATUS AND METHODS", filed Mar. 15, 2013, incorporated herein by reference in its entirety. In some implementations, as the robotic device 610 approaches the obstacle, the reinforcement signal may comprise negative reinforcement. As the robotic device 610 moves away from the obstacle, the reinforcement signal may comprise positive reinforcement.

Upon learning, the controller of the robotic device 610 may be capable of guiding the robotic device 610 through the environment 600 while avoiding obstacles 608, 602.

It may be desired to enable the robot 610 to perform additional operations (e.g., water plants). In some implementations, performing of obstacle avoidance navigational tasks may consume a majority (or all) computational resources of the controller so that learning of additional tasks (e.g., target approach) may not be feasible at the same time.

In one or more implementations, such as illustrated in the panel 620 of FIG. 6, the controller (e.g., 212 of FIG. 2A) of the robotic device 610 may be configured to transfer knowledge related to obstacle avoidance to a predictor (e.g., 202 in FIG. 2A). Obstacle avoidance knowledge transfer to the predictor may enable the predictor to learn to perform obstacle avoidance control actions. Transfer of knowledge from the controller, may free up sufficient amount of controller computational resources for performing additional operations (e.g., learning target approach). Target approach learning may be based on one or more reinforcement events depicted by stars 636 in panel 620. Responsive to the robotic device approaching the target (e.g., 626), positive reinforcement may be provided. Such functionality may enable the robotic device to perform additional tasks (e.g., water plants 622, 624, 626 while traversing trajectories (e.g., 636) shown in panel 620 of FIG. 6.

Figure 7:
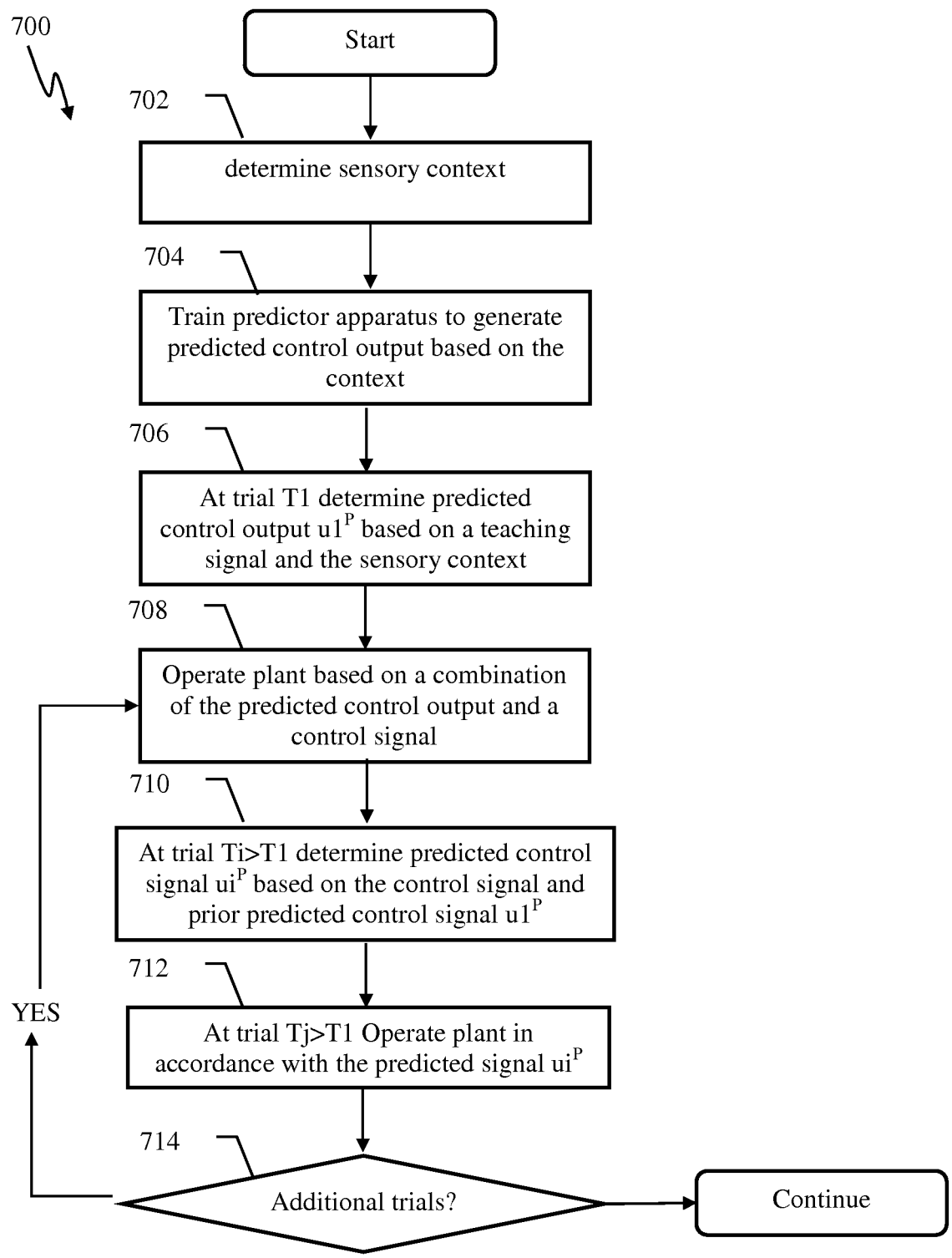
FIG. 7 is a logical flow diagram illustrating a method of training an adaptive predictor, in accordance with one or more implementations.
Figure 8A:
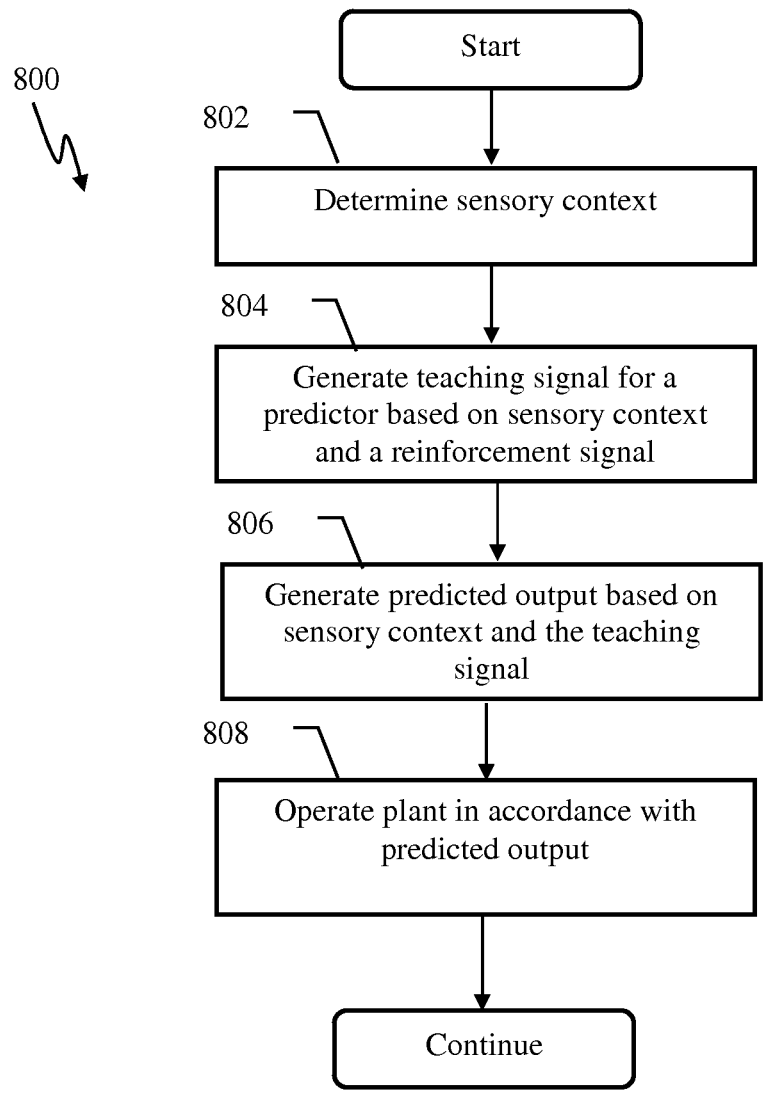
FIG. 8A is a logical flow diagram illustrating a method of operating an adaptive controller apparatus of, e.g., FIG. 2A, in accordance with one or more implementations.
Figure 8B:
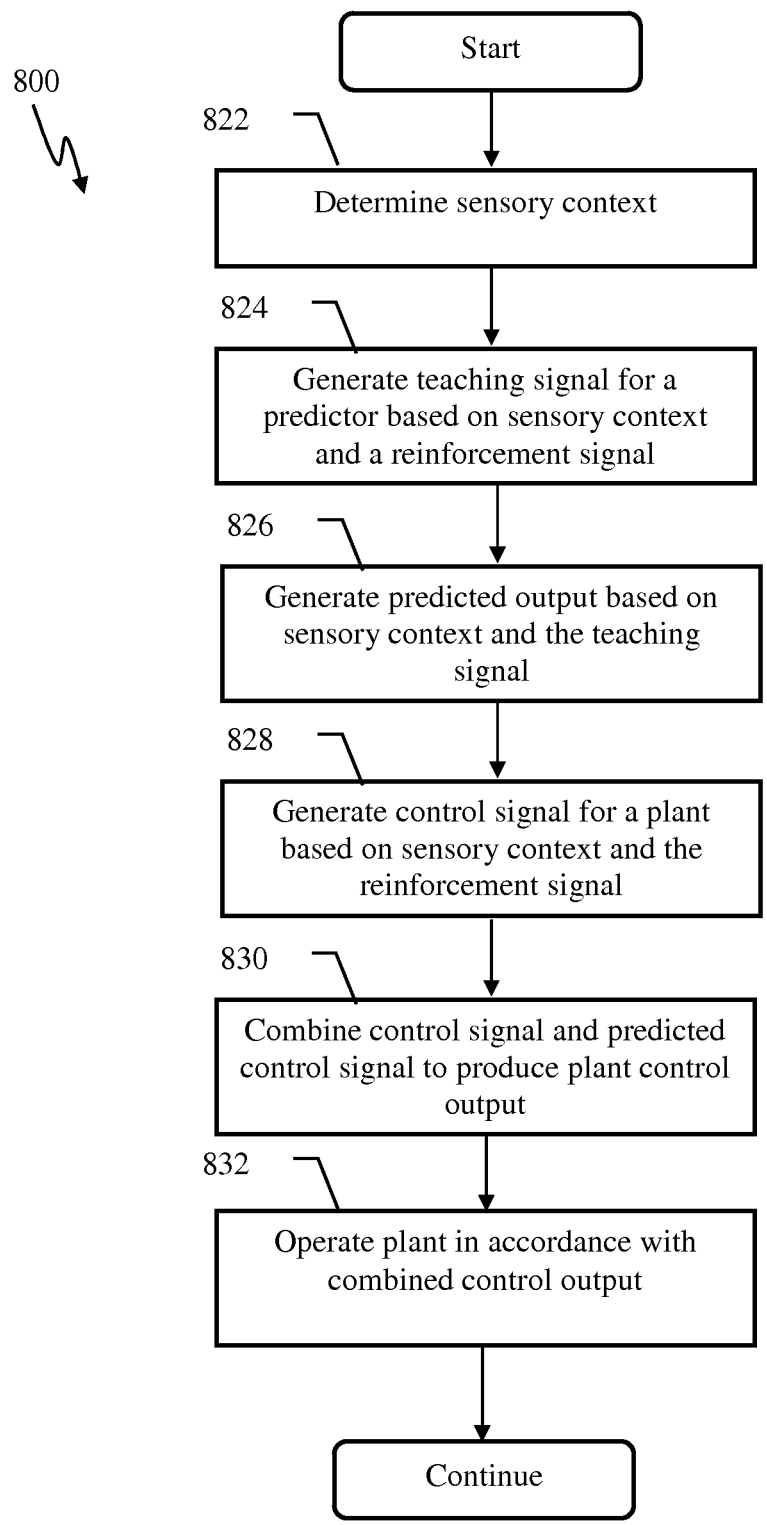
FIG. 8B is a logical flow diagram illustrating a method of operating an adaptive controller apparatus of, e.g., FIG. 2B, in accordance with one or more implementations.
Figure 8C:
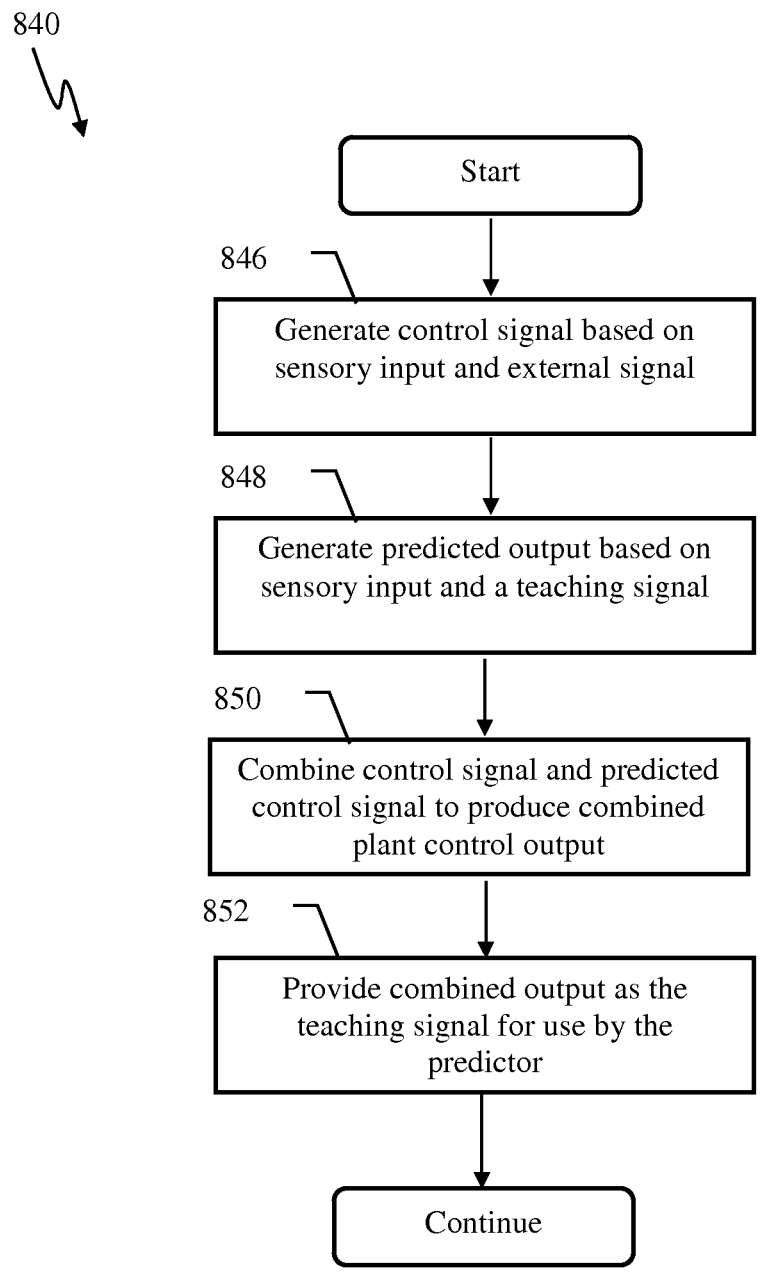
FIG. 8C is a logical flow diagram illustrating a method of operating an adaptive controller apparatus of, e.g., FIG. 2C, in accordance with one or more implementations.
Figure 9:
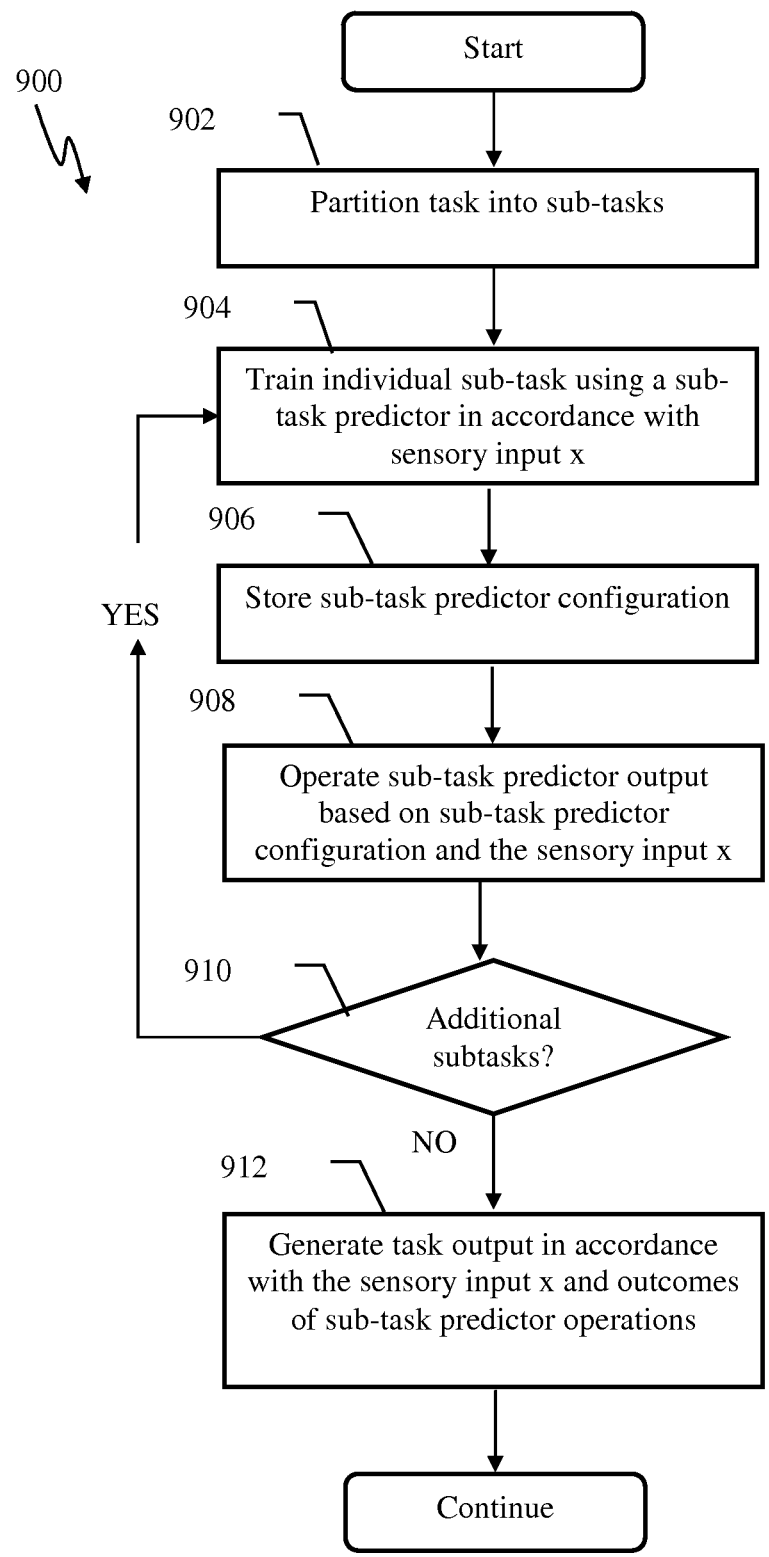
FIG. 9 is a logical flow diagram illustrating a method of developing a hierarchy of control tasks by a controller comprising an adaptive predictor, in accordance with one or more implementations.

FIGS. 7-9 illustrate methods of operating a control apparatus comprising an adaptive predictor, in accordance with one or more implementations. The operations of the methods illustrated in FIGS. 7-9 described below are intended to be illustrative. In some implementations, methods 700, 800, 820, 840, and/or 900 may be accomplished with one or more additional operations not described, and/or without one or more of the operations discussed. Additionally, the order in which the operations of methods are illustrated in FIGS. 7-9 and described below is not intended to be limiting.

In one or more implementations, methods of FIGS. 7-9 may be carried out by one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700, 800, 820, 840, and/or 900 using instructions stored electronically on an electronic storage medium. The one or more processing devices may include one or more devices configured through hardware, firmware, and/or software to be specifically designed for execution of one or more of the operations of methods 700, 800, 820, 840, and/or 900.

Referring now to FIG. 7, one exemplary implementation of a method of training a robotic device comprising an adaptive predictor is illustrated, in accordance with one or more implementations. The robotic apparatus may be configured to perform one or more tasks (e.g., approach a target).

At operation 702 of method 700, sensory context may be determined. In some implementations, the context may comprise on or more aspects of sensory input (e.g., 206) and/or plant feedback (216 in FIG. 2A). In one or more implementations, examples of aspects of the sensory input may include an object being detected in the input, a location of the object, an object characteristic (color/shape), a sequence of movements (e.g., a turn), a characteristic of an environment (e.g., an apparent motion of a wall and/or other surroundings turning a turn and/or approach) responsive to the movement, and/or other aspects of sensory input. In some implementation, the sensory input may be received based on performing one or more training trials (e.g., as the trials described with respect to FIGS. 2B-2C above) of a robotic apparatus.

At operation 704, training of the predictor apparatus may commence in order to generate predicted control output based on the context.

At operation 706, a predicted control signal $u1^P$ may be generated based on the context and a teaching signal. The teaching signal (e.g., 264 in FIG. 2C) may comprise a combination of the predicted control output and the control signal (e.g., 276 in FIG. 2C). In some implementations, the teaching signal (e.g., 214 in FIG. 2A) may correspond to an output of a controller (e.g., 208 in FIG. 2A) operable in accordance with reinforcement learning. In some implementations, the predictor may determine the predicted output based on one or more of sensory input (e.g., 206), plant feedback (216), and/or prior predictor state Q associated with the context that may have occurred previously. The predicted output may comprise a control command (e.g., turn by 9). Operation 706 may be executed as a part of a training trial.

At operation 708, plant of the robotic apparatus may be operated based on a combination of the predicted control output $u2^P$ and the control signal.

At operation 710, at another trial Ti>T1 predicted control signal $ui^P$ may be determined based on the control signal and prior predicted control output $u1^P$.

At operation 712, at the trial Tj>T1 plant of the robotic apparatus may be operated based on a combination of the predicted control output $ui^P$ and the control signal.

At operation 714 a determination may be made as to whether additional trials may be performed. If another trial is to be performed, the method may proceed to step 708.

FIG. 8A illustrates a method of operating an adaptive controller apparatus of, e.g., FIG. 2A, in accordance with one or more implementations.

At operation 802 of method 800, illustrated in FIG. 8A, sensory context may be determined. In some implementations, the context may comprise one or more aspects of sensory input, as described above with respect to operation 702 of FIG. 7A.

At operation 804, a teaching signal may be generated based on the context. In some implementations, the teaching signal may comprise an output of a controller apparatus (e.g., 212 in FIG. 2A) that may be configured based on reinforcement learning process. The teaching signal may comprise action indications and/or indicate a portion of state-space. In some implementations of autonomous navigation, the teaching signal may be used to indicate e.g., a quadrant where a waypoint may be located. In one or more implementations, the teaching signal (e.g., 264 in FIG. 2C) may comprise a combination of the predicted control output and the control signal (e.g., 276 in FIG. 2C). In one such implementation, the teaching signal may be determined by the controller (e.g., 212 in FIG. 2A) based on one or more prior training trials. During individual trials, an external agent (e.g., a human and/or a computerized agent) may provide reinforcement signal guiding the controller learning. The reinforcement signal may comprise one or more commands (e.g., left/right, and/or OK/NOT OK) configured to aid the controller to traverse the target trajectory (e.g., towards the target waypoint).

At operation 806, a predicted control signal may be generated based on the context and the teaching signal. In some implementations, the predictor may determine the predicted output based on one or more of sensory input (e.g., 206), plant feedback (216), and/or prior predictor state Q associated with the context that may have occurred previously. In one or more implementations, the teaching signal may be utilized in order to indicate a portion of the state-space to the predictor where the target solution may reside, e.g., as described with respect to FIG. 5 above. By way of illustration, the teaching signal may aid the predictor to determine the correct target waypoint (e.g., a house) based on the teaching signal indicating a quadrant for target search. Operation 806 may be executes as a part of a training trial.

At operation 808, plant of the robotic apparatus may be operated in accordance with the predicted control output. The predicted output may comprise a control command (e.g., turn by 9).

FIG. 8B illustrates a method of operating an adaptive controller apparatus of, e.g., FIG. 2B, in accordance with one or more implementations.

At operation 822 of method 820, illustrated in FIG. 8A, sensory context may be determined. In some implementations, the context may comprise on or more aspects of sensory input, as described above with respect to operation 702 of FIG. 7A.

At operation 824, a teaching signal may be generated based on the context. In some implementations, the teaching signal may comprise an output of a controller apparatus (e.g., 212 in FIG. 2A) that may be configured based on reinforcement learning process. The teaching signal may comprise action indications and/or indicate a portion of state-space. In some implementations of autonomous navigation, the teaching signal may be used to indicate, e.g., a quadrant where a waypoint may be located. In one or more implementations, the teaching signal (e.g., 264 in FIG. 2C) may comprise a combination of the predicted control output and the control signal (e.g., 276 in FIG. 2C). In one such implementation, the teaching signal may be determined by the controller (e.g., 212 in FIG. 2A) based on one or more prior training trials. During individual trials, an external agent (e.g., a human and/or a computerized agent) may provide reinforcement signal guiding the controller learning. The reinforcement signal may comprise one or more commands (e.g., left/right, and/or OK/NOT OK) configured to aid the controller to traverse the target trajectory (e.g., towards the target waypoint).

At operation 826, a predicted control signal may be generated based on the context and the teaching signal. In some implementations, the predictor may determine the predicted output based on one or more of sensory input (e.g., 206), plant feedback (216), and/or prior predictor state Q associated with the context that may have occurred previously. In one or more implementations, the teaching signal may be utilized in order to indicate a portion of the state-space to the predictor where the target solution may reside, e.g., as described with respect to FIG. 5 above. By way of illustration, the teaching signal may aid the predictor to determine the correct target waypoint (e.g., a house) based on the teaching signal indicating a quadrant for target search. Operation 826 may be executes as a part of a training trial.

At operation 828, a control signal may be generated based on the context. In some implementations, the teaching signal may comprise an output of a controller apparatus (e.g., 256 in FIG. 2B) that may be configured based on reinforcement learning process. In some implementations, the controller may determine the control output based on one or more of sensory input (e.g., 206), plant feedback (216), reinforcement signal (234), and/or other information.

At operation 830, the predicted output and the control signal may be combined to produce combined control output. In one or more implementations the predicted output and/or the control signal may comprise multichannel signal. In some implementations, the combined output (e.g., 258 in FIG. 2B) may comprise fewer channels (dimensions) compared to number of channels/dimensions associated with the controller signal (e.g., 238 in FIG. 2B), and/or number of channels/dimensions associated with the predictor output (e.g., 248 in FIG. 2B). The combiner (e.g., 250 in FIG. 2B) may be configured to one or more combine multichannel inputs into a single-channel control signal, as described for example, in, U.S. patent application Ser. No. 13/842,647 entitled "MULTICHANNEL ROBOTIC CONTROLLER APPARATUS AND METHODS", incorporated supra. As described in the above referenced application, a variety of data compression and/or multiple access techniques may be utilized in order to combine the predicted data stream with the controller data stream (into output data stream). In one or more implementations, multiple access techniques may be employed, such as, time division, frequency division, code division multiple access. In one or more implementations of spiking neuron networks, predictor output and/or combiner output may be encoded using sparse coding wherein individual information packets may be encoded by the strong activation of a relatively small set of neurons. Individual items may be encoded using a different subset of available neurons.

At operation 832, plant of the robotic apparatus may be operated in accordance with the predicted control output.

FIG. 8C illustrates a method of operating an adaptive controller apparatus of, e.g., FIG. 2C, in accordance with one or more implementations.

At operation 846 of method 840, a control signal may be generated. In some implementations, the control output may be determined by a controller (e.g., 272 in FIG. 2C) operable in accordance with reinforcement learning. The control signal may be based on one or more of sensory input (e.g., 206), plant feedback (216), and external reinforcement signal (e.g., 234 in FIG. 2C).

At operation 848, a predicted control signal may be generated. In some implementations, the predictor may determine the predicted output based on one or more of sensory input (e.g., 206), plant feedback (216), and/or prior predictor state Q associated with the context within the sensory input that may have occurred previously. In one or more implementations, the teaching signal may comprise an output of a combiner apparatus (e.g., 274 in FIG. 2C) that may be configured based on predicted output from a prior trial. The output of operation 848 may correspond to predictor output of a training trial.

At operation 850, the predicted output and the control signal may be combined to produce combined control output. In one or more implementations, the combined output may be generated by a combiner (e.g., 274) operated in accordance with a transfer function described, for example, by Eqn. 12-Eqn. 20 Eqn. 17, Eqn. 22

At operation 852 the combined output may be provided for generating the teaching signal configured to be used by the predictor at, for example, a subsequent trial.

FIG. 9 illustrates a method of developing a hierarchy of control tasks by a controller comprising an adaptive predictor, in accordance with one or more implementations.

At operation 902, a given task may be partitioned into two (or more) sub-tasks. In some implementations, such as a task of training of a robotic manipulator to grasp a particular object (e.g., a cup), the subtasks may correspond to identifying the cup (among other objects), approaching the cup, avoiding other objects (e.g., glasses, bottles), grasping the cup, and/or other subtasks. A subtask predictor may comprise action indication predictor.

At operation 904, a predictor for an individual sub-task may be trained in accordance with sensory input x. In one or more implementations, individual sub-task predictor may comprise one or more predictor configurations described, for example, with respect to FIGS. 2A-3E, 4, described above.

At operation 906, trained predictor configuration may be stored. In one or more implementations, the trained predictor configuration may comprise one or more of a neuron network configuration (e.g., number and/or type of neurons and/or connectivity), neuron states (excitability), connectivity (e.g., efficacy of connections), and/or other information.

At operation 908, sub-task predictor may be operated in accordance with the sub-task predictor configuration and the sensory input. In some implementations of a predictor corresponding to a composite task (e.g., 2100, 2110, 2112 in FIG. 21), predictor operation may comprise determining which lower level (within the hierarchy) predictors are to be activated, and/or plant control output is to be generated. In some implementations of a predictor corresponding to the lowest level task (e.g., 2120, 2122, in FIG. 21), predictor operation may comprise generation of control output.

At operation 910, a determination may be made as to whether additional subtask predictor may need to be trained. In some implementations, the predictor may be configured to perform the determination. In one or more implementations, a controller (e.g., 212 in FIG. 2B) and/or a teacher (e.g., an external human and/or computerized agent) may be configured to perform the determination.

Responsive to a determination that no additional subtasks remain, the method may proceed to step 912 where task output may be generated in accordance with the sensory input x and outcomes of the sub-task predictor operations performed at operation 908.

Adaptive predictor methodologies described herein may be utilized in a variety of processing apparatus configured to, for example, implement target approach and/or obstacle avoidance by autonomous robotic devices and/or sensory data processing (e.g., object recognition).

Figure 10A:
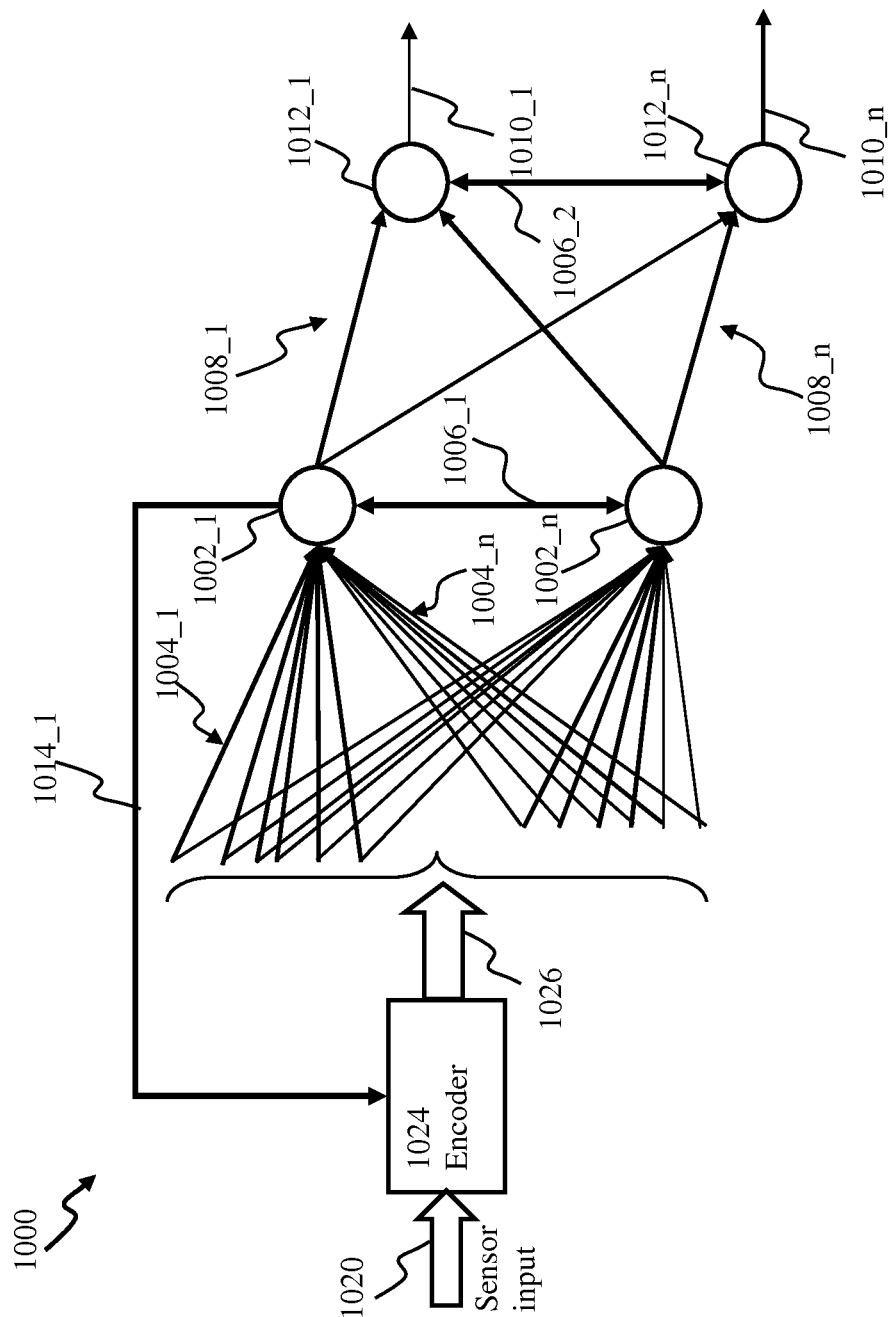
FIG. 10A is a block diagram illustrating a sensory processing apparatus useful with an adaptive controller of a robotic device of FIG. 10B, in accordance with one or more implementations.

One approach to object recognition and/or obstacle avoidance may comprise processing of optical flow using a spiking neural network comprising for example the self-motion cancellation mechanism, such as described, for example, in U.S. patent application Ser. No. 13/689,717, entitled "APPARATUS AND METHODS FOR OBJECT DETECTION VIA OPTICAL FLOW CANCELLATION", filed Nov. 30, 2012, the foregoing being incorporated herein by reference in its entirety, is shown in FIG. 10A. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, grayscale, and/or other representations) and/or frame rates are equally useful with the present invention. The apparatus 1000 may be embodied in, for example, an autonomous robotic device, e.g., the device 1060 of FIG. 10B.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent to optical flow due to one or more objects in the vicinity of the robotic device.

The encoder 1010 may receive signal 1004 representing motion of the robotic device. In one or more implementations, the input 1004 may comprise an output of an inertial sensor block. The inertial sensor block may comprise one or more acceleration sensors and/or acceleration rate of change (i.e., rate) sensors. In one or more implementations, the inertial sensor block may comprise a 3-axis accelerometer and/or 3-axis gyroscope. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the block 1010 may be configured to encode motion input 1004. One or more of the spiking neurons of the block 1010 may be configured to encode input 1002 into optical flow, as described in U.S. patent application Ser. No. 13/689,717, entitled "APPARATUS AND METHODS FOR OBJECT DETECTION VIA OPTICAL FLOW CANCELLATION", filed Nov. 30, 2012, incorporated supra.

The encoded signal 1026 may be communicated from the encoder 1010 via multiple connections (also referred to as transmission channels, communication channels, or synaptic connections) 1044 to one or more neuronal nodes (also referred to as the detectors) 1042.

In the implementation of FIG. 10A, individual detectors of the same hierarchical layer may be denoted by a "_n" designator, such that e.g., the designator 1042_1 denotes the first detector of the layer 1042. Although only two detectors (1042_1, 1042_n) are shown in the implementation of FIG. 10 for clarity, it will be appreciated that the encoder may be coupled to any number of detector nodes that is compatible with the detection apparatus hardware and software limitations. Furthermore, a single detector node may be coupled to any practical number of encoders.

In one implementation, individual detectors 1042_1, 1042_n may contain logic (which may be implemented as a software code, hardware logic, or a combination of thereof) configured to recognize a predetermined pattern of pulses in the encoded signal 1026 to produce post-synaptic detection signals transmitted over communication channels 1048. Such recognition may include one or more mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each of the foregoing incorporated herein by reference in its entirety. In FIG. 10A, the designators 1048_1, 1048_n denote output of the detectors 1042_1, 1042_n, respectively.

In some implementations, the detection signals may be delivered to a next layer of detectors 1052 (comprising detectors 1052_1, 1052_m, 1052_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra. In such implementations, individual subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 1048_1, 1048_n (with an appropriate latency) that may propagate with different conduction delays to the detectors 1052. The detector cascade of the implementation of FIG. 10 may contain any practical number of detector nodes and detector banks determined, inter alia, by the software/hardware resources of the detection apparatus and complexity of the objects being detected.

The sensory processing apparatus 1000 illustrated in FIG. 10A may further comprise one or more lateral connections 1046, configured to provide information about activity of neighboring neurons to one another.

In some implementations, the apparatus 1000 may comprise feedback connections 1006, 1056, configured to communicate context information from detectors within one hierarchy layer to previous layers, as illustrated by the feedback connections 1056_1, 1056_2 in FIG. 10. In some implementations, the feedback connection 1006 may be configured to provide feedback to the encoder 1010 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 10B:
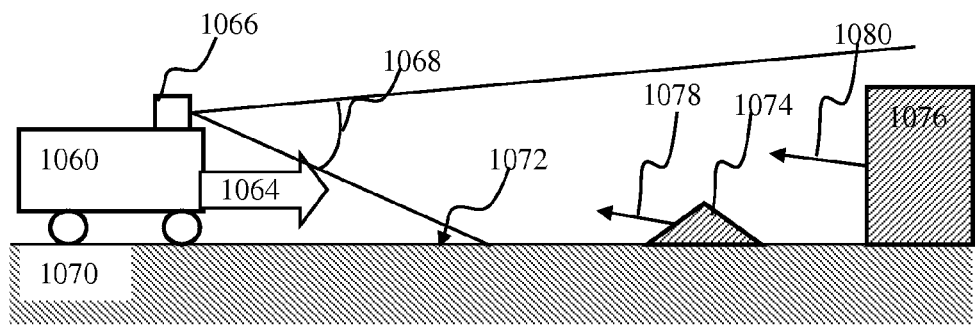
FIG. 10B is a graphical illustration depicting robotic apparatus comprising an adaptive controller apparatus of the disclosure configured for obstacle avoidance, in accordance with one or more implementations.

FIG. 10B a mobile robotic apparatus that may be configured with an adaptive controller implementation illustrated in FIG. 10A, supra. The robotic apparatus 1060 may comprise a camera 1066. The camera 1066 may be characterized by a field of view 1068. The camera 1066 may provide information associated with objects within the field-of-view. In some implementations, the camera 1066 may provide frames of pixels of luminance, refreshed at 25 Hz frame rate.

One or more objects (e.g., a stationary object 1074 and a moving object 1076) may be present in the camera field of view. The motion of the objects may result in a displacement of pixels representing the objects within successive frames, such as described in in U.S. patent application Ser. No. 13/689,717, entitled "APPARATUS AND METHODS FOR OBJECT DETECTION VIA OPTICAL FLOW CANCELLATION", filed Nov. 30, 2012, incorporated, supra.

When the robotic apparatus 1060 is in motion, such as shown by arrow 1064 in FIG. 10B, the optical flow estimated from the image data may comprise the self-motion component and the object motion component. By way of a non-limiting example, the optical flow measured by the rover of FIG. 10B may comprise one or more of (i) self-motion components of the stationary object 1078 and the boundary (e.g., the component 1072 associated with the floor boundary); (ii) component 1080 associated with the moving objects 116 that comprises a superposition of the optical flow components due to the object displacement and displacement of the robotic apparatus, and/or other components.

Various exemplary spiking network apparatuses configured to perform one or more of the methods set forth herein (e.g., adaptive predictor functionality) are now described with respect to FIGS. 11A-11D.

Figure 11A:
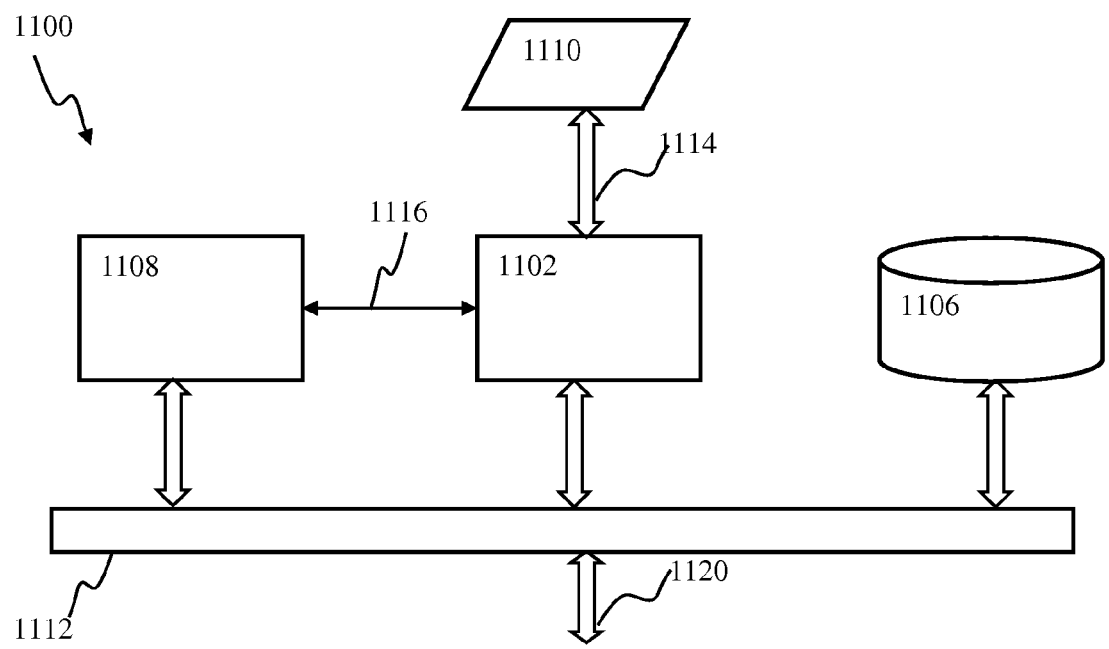
FIG. 11A is a block diagram illustrating computerized system useful for reinforcement-guided supervised learning mechanism in a spiking network, in accordance with one or more implementations.

One particular implementation of the computerized neuromorphic processing system, for use with an adaptive robotic controller described, supra, is illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100, e.g. One such implementation may comprise a central processing apparatus coupled to one or more remote camera devices providing sensory input to the adaptive predictor block (e.g., block 202 in FIG. 2A).

The system 1100 further may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference, supra In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

Figure 11B:
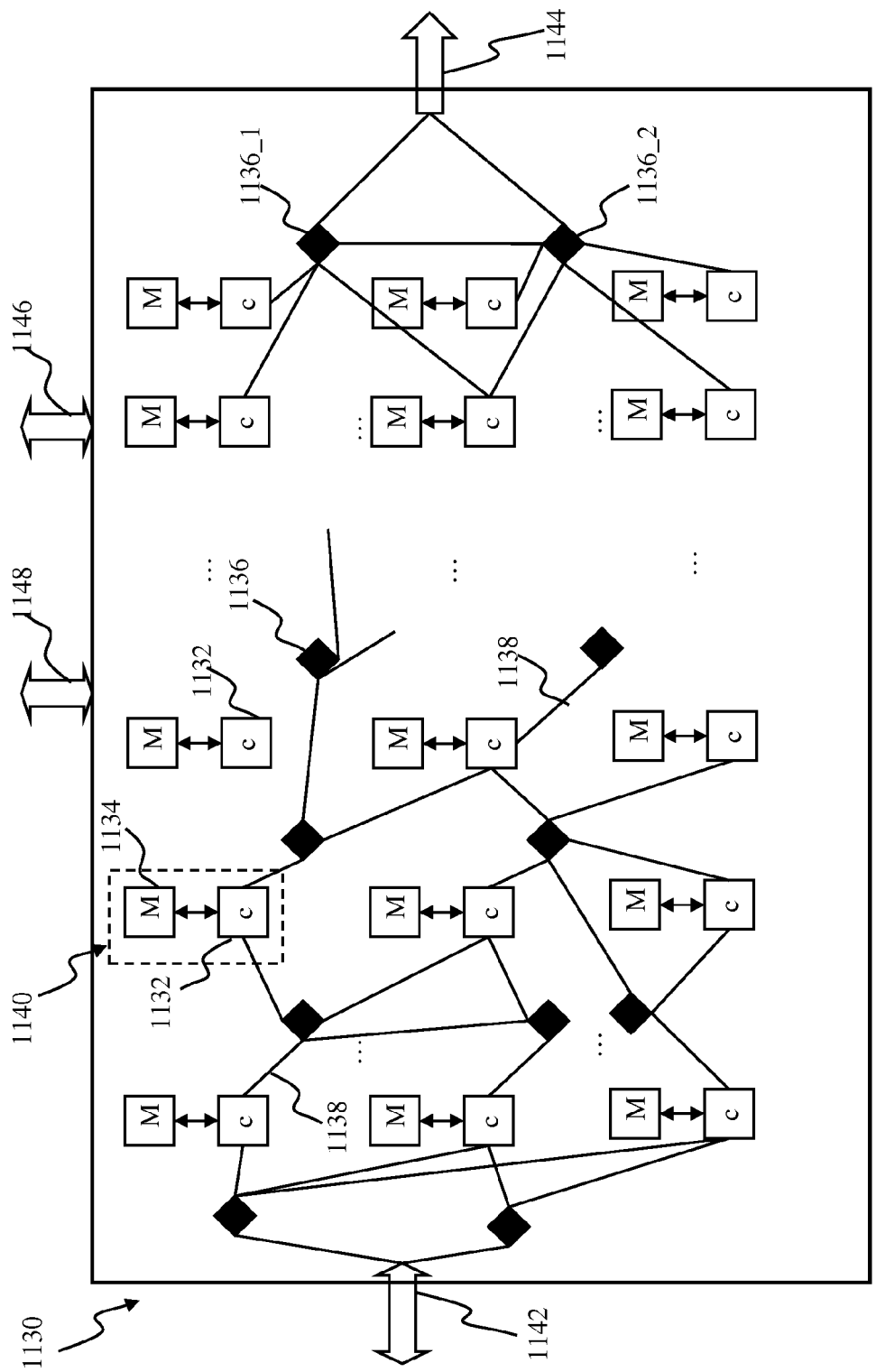
FIG. 11B is a block diagram illustrating a neuromorphic computerized system useful with reinforcement-guided supervised learning mechanism in a spiking network, in accordance with one or more implementations.

Referring now to FIG. 11B, one implementation of neuromorphic computerized system configured to implement controller and/or predictor adaptation mechanisms using, for example, a neuron network is described in detail. In some implementations, the network may comprise multiple spiking neurons. The neuromorphic processing system 1130 of FIG. 11B may comprise a plurality of processing blocks (microblocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. External memory may include one or more of a Flash drive, a magnetic drive, and/or other external memory.

Figure 11C:
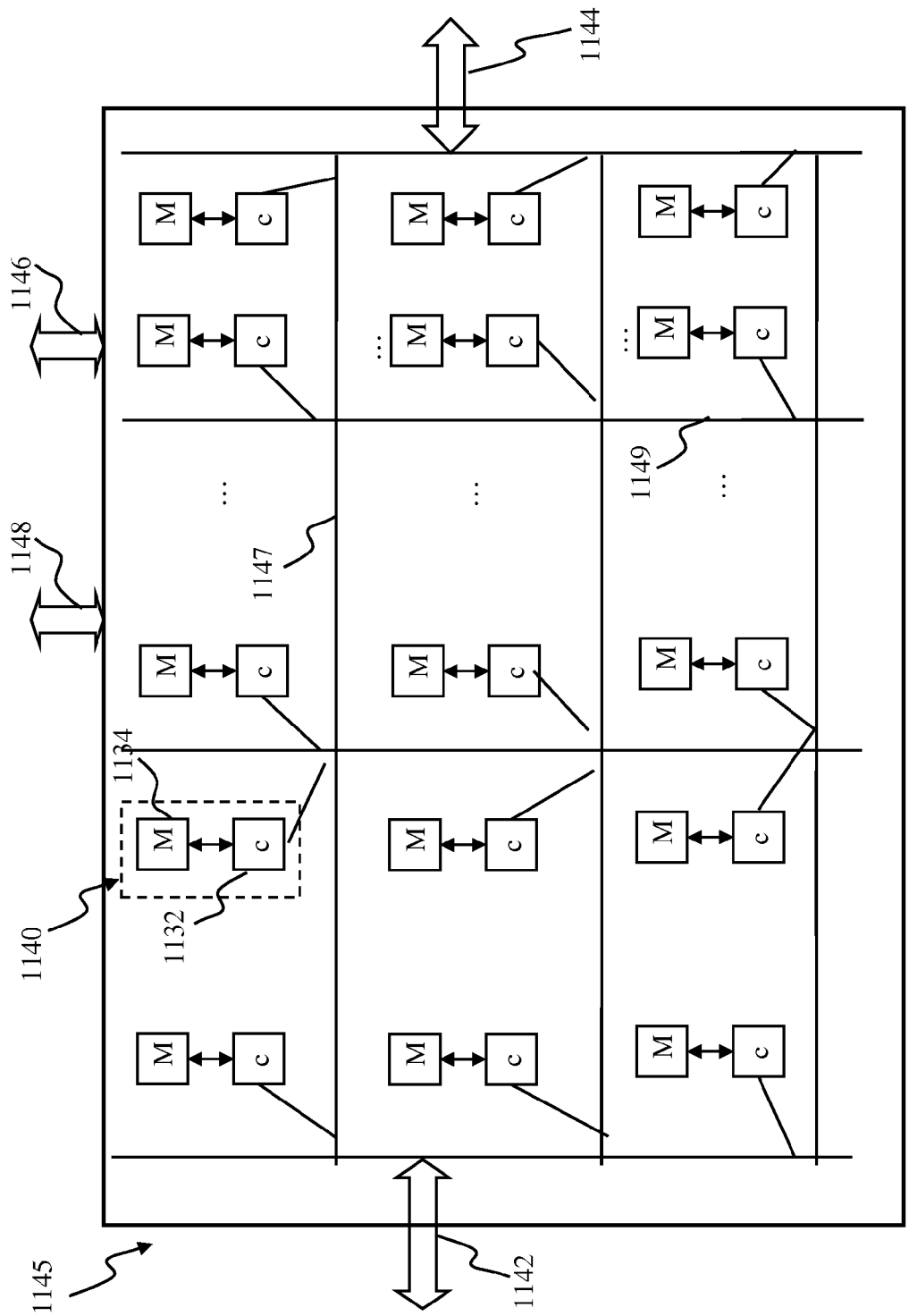
FIG. 11C is a block diagram illustrating a hierarchical neuromorphic computerized system architecture useful with reinforcement-guided supervised learning mechanism in a spiking network, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
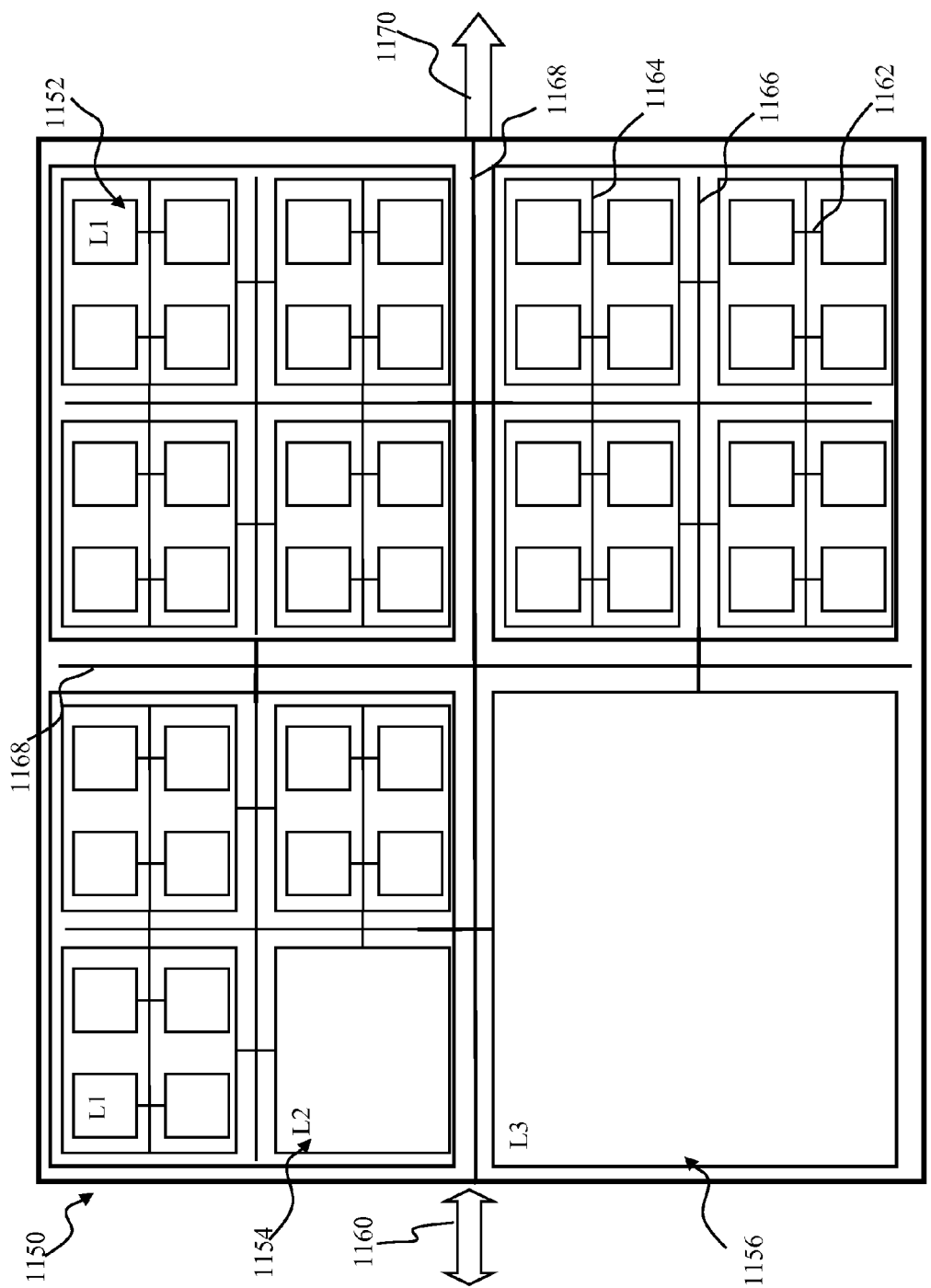
FIG. 11D is a block diagram illustrating cell-type neuromorphic computerized system architecture useful with reinforcement-guided supervised learning mechanism in a spiking network, in accordance with one or more implementations.

FIG. 11D illustrates one implementation of cell-based neuromorphic computerized system architecture configured to optical flow encoding mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11*d*. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576, entitled "DYNAMICALLY RECONFIGURABLE STOCHASTIC LEARNING APPARATUS AND METHODS", incorporated, supra.

In one or more implementations, one or more portions of the apparatus 1150 may be configured to operate one or more learning rules, as described for example in owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

In one or more implementations, networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS", filed Sep. 21, 2011, and/or High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing incorporated, supra. In one or more implementations, the HLND framework may be augmented to handle event based update methodology described, for example U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012, the foregoing being incorporated herein by reference in its entirety. In some implementations, the networks may be updated using an efficient network update methodology, described, for example, U.S. patent application Ser. No. 13/239,259, entitled "APPARATUS AND METHOD FOR PARTIAL EVALUATION OF SYNAPTIC UPDATES BASED ON SYSTEM EVENTS", filed Sep. 21, 2011 and/or U.S. patent application Ser. No. 13/385,938, entitled "APPARATUS AND METHODS FOR EFFICIENT UPDATES SPIKING NEURON NETWORKS", filed Jul. 27, 2012, each of the foregoing being incorporated herein by reference in its entirety.

In some implementations, the HLND framework may be utilized to define network, unit type and location, and/or synaptic connectivity. HLND tags and/or coordinate parameters may be utilized in order to, for example, define an area of the localized inhibition of the disclosure described above In some implementations, the END may be used to describe and/or simulate large-scale neuronal model using software and/or hardware engines. The END allows optimal architecture realizations comprising a high-performance parallel processing of spiking networks with spike-timing dependent plasticity. Neuronal network configured in accordance with the END may comprise units and doublets, the doublets being connected to a pair of units.

Adaptive predictor and control methodology described herein may advantageously enable training of robotic controllers. Previously learned actions (primitives) may be reused in subsequent actions that may comprise the same and/or similar control operations. A hierarchy of control actions (primitives) may be developed so as to enable a single higher-level action indication (by an operator) to invoke execution two (or more) lower level by the predictor actions without necessitating generation of the explicit control instructions by the operator. By way of an illustration, a task of teaching a robot to reach for an object may be partitioned into two or more (simpler) sub-tasks: e.g., approach target and/or avoid obstacles. In turn, individual tasks approach target and/or avoid obstacles may be partitioned into a sequence of robot movements (e.g., turn left/right, go forward/backwards). One or more predictors of the robot controller may be trained to perform lower level. Another predictor may be trained to associate an action indicator (e.g., approach) with one or more movement tasks. A hierarchy of action primitives may enable an operator to operate the robot to perform composite tasks based on previously learned sub-tasks.

When teaching the controller a new task (behavior of serving a glass of water), using the previously learned behaviors and/or primitives (reaching, grasping an object, etc.) may be utilized thereby accelerating learning compared to methods of the prior art.

One or more predictors may be configured to learn to execute learned tasks may be When teaching the controller a new task (behavior of serving a glass of water), using the previously learned behaviors and/or primitives (reaching, grasping an object, etc.) may be utilized thereby accelerating learning compared to methods of the prior art.

The learning process of the adaptive predictor may comprise supervised learning process, operated in accordance with a teaching input from a supervisor agent. Supervised learning may utilize fewer memory and/or computational resources (due to, e.g., a smaller exploration state space). The computational efficiency may be leveraged to implement more complex controller (for given hardware resources) and/or to reduce hardware complexity (for a given controller task load).

In one or more obstacle avoidance applications, an adaptive predictor apparatus may be configured to learn to anticipate the obstacles, allowing for faster and smoother anticipatory avoidance behavior.

In one or more object recognition applications, an adaptive predictor apparatus may speed-up and/or improve reliability of object detection in the presence of noisy and/or otherwise poor sensory information ("pattern completion".)

In some implementations, it may be desirable to add new functionality (e.g., enable a ROOMBA® robotic cleaner to perform a new task, e.g., dust blinds and/or detect cold drafts in windows) to an existing robot. In some realizations, hardware platform of the existing robot may be optimized for a given set of tasks and may not be capable (due to, e.g., memory and/or computational capacity limitations) of performing additional tasks (e.g., searching for cold drafts) contemporaneous with the execution of other tasks e.g., vacuuming). Reinforcement guided supervised methodology described herein may enable addition of new features by transferring a portion of the robotic controller knowledge to one or more predictors operable based on supervised learning.

In one or more implementation, the reinforcement guided supervised learning may enable a more efficient utilization of robotic controller resources, when compared to system of the prior art that may employ one (or multiple) reinforcement learning controllers. As described with respect to FIGS. 4-5, supervised learning may rely on prior knowledge of the state space (e.g., provided via a training signal); hence supervised learning may be characterized by faster learning and/or use of fewer resources compared to reinforcement learning. Reinforcement learning may be capable of learning more complex tasks (e.g., locate a global optimal solution), compared to supervised learning, due to, for example, exploration.

A combination of reinforcement and supervised learning may enable a more efficient use of controller computational resources. Such resource use efficiency may be traded for a reduced size and/.or cost controller configuration (for a given task set); and/or controller capability to perform additional tasks (e.g., water plants) for a given hardware configuration.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A method of generating a predicted control output by an adaptive controller of a robotic apparatus comprising a predictor and a combiner, the method comprising:
    operating the adaptive controller in accordance with a reinforcement learning process based on a reinforcement signal, the reinforcement signal being based on a performance measure associated with the reinforcement learning process;
    operating the predictor in accordance with a supervised learning process based on a teaching signal, the teaching signal conveying information related to a target output of the predictor;
    generating a control output via the adaptive controller based on a sensory input and the reinforcement signal, the sensory input including information associated with an environment of the robotic apparatus;
    determining a predicted control output via the predictor based on the sensory input and the teaching signal;
    determining a combined output via the combiner based on the control output and the predicted control output, the combined output being characterized by a transform function; and
    providing the combined output via the adaptive controller to the robotic apparatus, the combined output causing the robotic apparatus to execute a maneuver in accordance with the sensory input;
    wherein the teaching signal comprises the combined control output.

2. The method of claim 1, wherein:
    the sensory input comprises a representation of an object being present in the sensory input; and
    the execution of the maneuver in accordance with the sensory input comprises one or both of approaching the object or avoiding the object.

3. The method of claim 2, wherein:
    the sensory input comprises a stream of digitized frames of pixels; and
    the representation of the object is determined based on a spatial configuration of two or more pixels within at least one frame of the stream of digitized frames.

4. The method of claim 1, wherein:
    the reinforcement learning process is characterized by a learning parameter;
    the reinforcement signal is configured to cause an adjustment of the learning parameter based on a value of the performance measure;
    the control output is determined based on the learning parameter;
    the process performance is determined based on a quantity determined based on the control output and target control output; and
    the adjusting of the learning parameter causes generation of a second control output, the second output being characterized by a reduced value of the quantity for the sensory input.

5. The method of claim 4, wherein:
    the reinforcement signal comprises positive reinforcement responsive to the second output being closer to the target control output relative to the control output; and
    the reinforcement signal comprises negative reinforcement responsive to the second output being farther away from the target control output relative to the control output.

6. The method of claim 1, wherein the transform function combines the predicted output and the control output via one or more operations including an additive operation.

7. The method of claim 1, wherein the transform function combines the predicted output and the control output via one or more operations including a union operation.

8. The method of claim 1, wherein the predicted control output comprises a signal causing the robotic apparatus to execute a portion of the maneuver.

9. The method of claim 1, wherein the transform function provides the predicted control output responsive to the control output comprising a zero signal, the zero signal corresponding to a base state of the control output.

10. The method of claim 9, wherein:
    the transform function provides the control output responsive to the predicted control output comprising the zero signal;
    the control output, the combined output, and the predicted control output each comprise a spiking signal characterized by spike rate;
    the zero signal corresponds to a base spike rate; and
    a non-zero signal characterized by a spike rate substantially different from the base spike rate.

11. The method of claim 1, wherein the transform function is characterized by a delay parameter such that the combined output at a first time instance is based on the control output at a second time instance, the second time instance preceding the first time instance by a current value of the delay parameter.

12. The method of claim 1, wherein:
    the reinforcement learning process is based on a network of computerized neurons adapted in accordance with the sensory input and the reinforcement signal;
    multiple ones of the computerized neurons are interconnected by connections characterized by connection efficacy; and
    the adaptation comprises adapting the connection efficacy of individual connections based on the sensory input and the reinforcement signal.

13. The method of claim 1, wherein:
the supervised learning process is based on a network of computerized neurons adapted in accordance with the sensory input and the teaching signal;
multiple ones of the computerized neurons are interconnected by connections characterized by connection efficacy; and
the supervised learning process adaptation comprises adapting the connection efficacy of individual connections based on the sensory input and the teaching signal.

14. The method of claim 13, wherein:
the supervised learning process is be updated at time intervals; and
the adaptation is based on an error measure between (i) the predicted output generated at a given time instance and (ii) the teaching signal determined at another given time instance prior to the given time instance, the given time instance and the other given time instance separated by one of the time intervals.

15. A computerized controller apparatus of a robot, the apparatus comprising:
a controller block;
a predictor block; and
one or more processors configured to execute computer program modules to perform a method of transferring information related to execution of a control task associated with a sensory context by the robot from the controller block to the predictor block, the method comprising:
configuring the predictor block to operate in accordance with a supervised learning process based on a teaching input, the teaching input being provided by the control block based on a reinforcement learning process configured to be adapted based on the sensory context and a reinforcement signal, the reinforcement learning process adaptation being configured to occur during one or more trials effectuated prior to the provision of the teaching input; and
based on the sensory context, causing the predictor block to generate a predicted control output that causes the execution of the control task.

16. The apparatus of claim 15, wherein the reinforcement learning process adaptation is configured to cause generation of a control output by the control block prior to the provision of the teaching input, the control output configured to cause the execution of the control task.

17. The apparatus of claim 16, wherein the predicted control output generation is based on an adaptation of the supervised learning process responsive to the teaching input, the adaptation of the supervised learning process effectuated during two or more successive training epochs such that there exists at least one epoch of the two or more training epochs wherein output of the predictor block is incapable of causing the execution of the control task.

18. A computerized robotic control apparatus, comprising:
one or more processors configured to by machine-readable instructions to:
determine a teaching signal based on a sensory input, the teaching signal conveying information associated with a target action consistent with the sensory input, the sensory input being indicative of at least one object in an environment of the robotic apparatus;
determine a control signal based on the sensory input, the control signal conveying information associated with the target action;
determine a predicted control signal based on the sensory input and the teaching signal, the predicted control conveying information associated with the target action; and
combine the control signal and the predicted control signal into a combined control output, the combined control output causing the robotic apparatus to execute a maneuver, the target action comprising the maneuver.

19. The apparatus of claim 18, wherein the one or more processors are further configured by machine-readable instructions to:
adapt a supervised learning process based on the sensory input and the teaching signal; and
determine the teaching signal and the control signal in accordance with a reinforcement learning process based on the sensory input and a reinforcement signal provided by an external agent, the reinforcement learning process being configured to cause the determination of the control signal, the reinforcement signal being based on a performance measure associated with the reinforcement learning process.

20. The apparatus of claim 19, wherein the external agent is either a human operator or a computerized apparatus configured to generate the reinforcement signal based on a performance measure associated with the execution of the maneuver.

* * * * *